United States Patent

Katou et al.

(10) Patent No.: US 7,695,028 B2
(45) Date of Patent: Apr. 13, 2010

(54) LOCK APPARATUS

(75) Inventors: Kouichi Katou, Kanagawa (JP); Noboru Niikura, Kanagawa (JP); Toshihiko Ookawara, Kanagawa (JP)

(73) Assignees: Piolax, Inc., Yokohama-shi, Kanagawa-ken (JP); Kanto Auto Works, Ltd., Yokosuka-shi, Kanagawa-ken (JP)

( * ) Notice: Subject to any disclaimer, the term of this patent is extended or adjusted under 35 U.S.C. 154(b) by 213 days.

(21) Appl. No.: 10/702,038

(22) Filed: Nov. 6, 2003

(65) Prior Publication Data

US 2004/0189012 A1 Sep. 30, 2004

(30) Foreign Application Priority Data

Nov. 7, 2002 (JP) .......................... P. 2002-323616
Oct. 24, 2003 (JP) .......................... P. 2003-364097

(51) Int. Cl.
*E05C 1/12* (2006.01)
*E05C 9/16* (2006.01)

(52) U.S. Cl. ............................ 292/34; 292/37; 292/156; 292/159; 292/165; 292/169.11

(58) Field of Classification Search ............ 292/32–34, 292/37, 40, 156–157, 159, 161, 165, 170, 292/DIG. 53, DIG. 38, 169.11; 403/289, 403/371, 280, 282, 329

See application file for complete search history.

(56) References Cited

U.S. PATENT DOCUMENTS 1,039,354 A * 9/1912 Bonadio ..................... 403/329
1,716,605 A * 6/1929 Shepard ...................... 403/329
2,088,665 A * 8/1937 Pinson ......................... 292/37
2,136,854 A * 11/1938 Knott .................. 292/DIG. 31
3,596,952 A * 8/1971 Hinkle et al. ................. 292/30

(Continued)

FOREIGN PATENT DOCUMENTS

JP          4-60079         2/1992

(Continued)

OTHER PUBLICATIONS

German Office Action dated Oct. 16, 2006 with an English translation.

*Primary Examiner*—Peter M Cuomo
*Assistant Examiner*—Christopher Boswell
(74) *Attorney, Agent, or Firm*—McGinn IP Law Group PLLC

(57) ABSTRACT

A lock apparatus includes a operation handle, a pair of springs movably supported by the container member, a pair of slide pins urged in directions of lock holes defined on the support member by the springs, respectively, and a pair of cam members to which rear end portions of the slide pins are fitted, respectively, to urge each slide pin to project and retract. When the operation handle is operated in a swing manner, a front end portion of each slide pin is retracted from each lock hole of the support member against pressure of each spring. Engagement holes are defined on opposed surfaces of each front end portion of the cam member having a cylindrical shape. Each rear end portion of the slide pin is formed in a bifurcated structure to have elastic pieces. Each of elastic pieces has a protrusion for detachably engaging with each of engagement holes.

22 Claims, 22 Drawing Sheets

U.S. PATENT DOCUMENTS

| | | | |
|---|---|---|---|
| 4,118,055 A * | 10/1978 | Bischoff, Jr. | 292/165 |
| 4,711,595 A * | 12/1987 | Magid et al. | 403/329 |
| 4,781,407 A | 11/1988 | Rauchhaus | |
| 4,898,493 A * | 2/1990 | Blankenburg | 403/326 |
| 5,149,152 A * | 9/1992 | Lanius | 292/37 |
| 5,342,101 A * | 8/1994 | Shih | 292/165 |
| 5,413,391 A * | 5/1995 | Clavin et al. | 292/DIG. 31 |
| 5,516,163 A | 5/1996 | Baker | |
| 5,516,190 A * | 5/1996 | Kain et al. | 297/183.6 |
| 5,688,000 A * | 11/1997 | Dolman | 292/34 |
| 5,893,300 A * | 4/1999 | Liao | 403/326 |
| 5,898,172 A * | 4/1999 | Masui et al. | 403/329 |
| 6,120,069 A * | 9/2000 | Taranto | 292/35 |
| 6,152,512 A * | 11/2000 | Brown et al. | 296/37.12 |
| 6,155,741 A * | 12/2000 | Took | 403/329 |
| 6,292,979 B1 * | 9/2001 | Kuo | 403/326 |
| 6,322,282 B1 * | 11/2001 | Kussman et al. | 403/329 |
| 6,350,418 B1 * | 2/2002 | Venderpool et al. | 292/37 |
| 6,460,902 B1 * | 10/2002 | Kyle | 292/165 |
| 6,622,883 B1 * | 9/2003 | Wu et al. | 292/36 |
| 6,669,243 B2 * | 12/2003 | Katoh et al. | 292/34 |
| 6,733,049 B2 * | 5/2004 | Piorkowski et al. | 292/139 |
| 6,834,895 B2 * | 12/2004 | Lin | 292/34 |
| 6,854,919 B2 * | 2/2005 | Neumann et al. | 403/326 |
| 6,913,297 B2 * | 7/2005 | Jackson et al. | 292/196 |
| 7,048,311 B2 * | 5/2006 | Sawatani et al. | 292/33 |
| 7,182,373 B2 * | 2/2007 | Yamada | 292/32 |
| 7,455,333 B2 * | 11/2008 | Ookawara | 292/34 |
| 2004/0256863 A1 * | 12/2004 | Tsai | 292/165 |
| 2007/0163310 A1 * | 7/2007 | Ookawara et al. | 292/32 |

FOREIGN PATENT DOCUMENTS

| | | |
|---|---|---|
| JP | 2003-13647 | 1/2003 |

* cited by examiner

A-A

B-B

C-C

D-D

E-E

LOCK APPARATUS

The present disclosure relates to the subject matter contained in Japanese Patent Application No. 2002-323616 filed on Nov. 7, 2002 and Japanese Patent Application No. 2003-364097 filed on Oct. 24, 2003, which are incorporated herein by reference in its entirety.

BACKGROUND OF THE INVENTION

1. Field of the Invention

The present invention relates to a lock apparatus used in, for example, a glove box, which is axially supported to be rotatable, on an instrument panel of a vehicle.

2. Description of the Related Art

Although not specifically illustrated, JP-A-Hei. 4-60079 discloses a lock apparatus in which a pair of left and right link levers are supported axially to be rotatable, inside a housing provided by a glove box, thereby to fix a pair of slide pins, which go in and out at lock holes defined in the instrument panel, to an upper end portion of each of left and right link levers. A tension coil spring, which normally urges the respective left and right slide pins in directions of engaging into the lock holes, is mounted between lower end portions of the left and right link levers.

Further, in a state of closing the glove box, front end portions of the slide pins fixed to the upper end portions of the respective left and right link levers are engaged into the corresponding left and right lock holes on the instrument panel to lock the glove box at a closed position. In the case of opening the glove box by releasing the locked state, when respective projected arms provided to be opposed to middle portions of the pair of left and right link levers are pushed down against urge spring pressure of the tension coil spring by a swing operation of an operation handle, the respective left and right link levers are rotated in a direction reverse to the urging direction to retract the front end portions of the slide pins from the lock holes. Therefore, it becomes possible to move the glove box in an opening direction.

Although not specifically illustrated, U.S. Pat. No. 4,781,407 discloses another lock apparatus having the following configuration. A pair of inner cylindrical members formed cam grooves thereon is provided on the grove box main body movably. The respective inner cylindrical members are connected with a pair of slide pins going in and out lock holes defined in an instrument panel. A compression coil spring for urging the left and right slide pins normally in directions of engaging into the lock holes is mounted between the respective inner cylindrical members. On the other hand, on an operation handle, outer circular arc members being fitted to the inner cylindrical members to have the same axis and a pair of projected portions moving along groove edges of the cam grooves are provided.

Further, in a state of closing the glove box, front end portions of the slide pins are engaged into the left and right lock holes on the instrument panel to lock the glove box at the closed position since the projected portions on the operation handle are located on the inner sides of the corresponding cam grooves. In the case of opening the glove box by releasing the locked state, when the projected portions on the operation handle are shifted to outer sides of the cam grooves of the inner cylindrical member by operating to swing the operation handle, the left and right inner cylindrical members are moved in directions of approaching each other against urge pressure of the compression springs. Thereby, the front end portions of the respective slide pins are retracted from the lock holes. Therefore, it becomes possible to move the glove box in an opening direction thereby.

Further, JP-A-2003-13647 discloses still another lock apparatus hating the following configuration. A pair of outer cylindrical members formed cam grooves thereon are integrally provided on an operation handle. On the other hand, the inner cylindrical members having projected portions moving along groove edges of the cam grooves are fitted into the respective outer cylindrical members concentrically. The respective inner cylindrical members are connected with slide pins going in and out lock holes defined in an instrument panel. A compression coil spring for normally urging each slide pin in a direction of engaging with each lock hole is mounted in each outer cylindrical member.

In a state of closing the glove box main body, since the projected portions on the inner cylindrical members are positioned on outer sides of the cam grooves, front end portions of the left and right slide pins are engaged with the lock holes on the instrument panel to lock the glove box main body at a closed position thereof. In the case of opening the glove box main body by releasing the locked state, when the projected portions on the inner cylindrical members are moved to inner sides of the cam grooves of the outer cylindrical members by a swing operation of the operation handle, the left and right inner cylindrical members are moved in directions of being adjacent with each other against an urge spring pressure of the compression coil springs. Thereby, the front end portions of the respective slide pins are retracted from the lock holes. Therefore, it becomes possible to move the glove box main body in an opening direction.

Therefore, in the lock apparatus disclosed in JP-A-Hei. 4-60079, there is an advantage of simply achieving a locked state and a lock released state at both sides of the glove box, on the other hand. However, since the pair of left and right slide pins are fixed to the corresponding link levers, for example, when the glove box per se is destroyed, the slide pin cannot be easily removed from the link lever. Therefore, needless to say that it is impossible to reuse the slid pin. In addition, since it is impossible to detach the housing containing the link lever therein and the operation handle from the glove box due to this fact, it is also impossible to reuse them. Particularly, a cylinder lock is provided at a vicinity of the housing and the operation handle. Therefore, if the cylinder lock is reused, it is necessary to destroy the housing and the operation handle.

In the lock apparatus disclosed in U.S. Pat. No. 4,781,407 and JP-A-2003-13647, the front end portions of the slide pins can be retracted from the lock holes on the instrument panel by converting swing movement of the operation handle into linear movement. However, when an operator lets go the operation handle after bringing the glove box main body into the opened state under such a configuration, a constraining state between the projected portions and the cam grooves is released and the slide pins are projected in directions of the lock holes rapidly by receiving the urge spring pressure of the compression coil springs. Thereby, it is often feared to emit large impact sound because stoppers restricting a projection amount of the slide pins collide each other. Therefore, the operator is reminded of breakage of the lock apparatus to give an uneasy feeling, a distrustful feeling or an unpleasant feeling.

Further, such fear may occur when the slide pins are projected into the lock holes under closing the glove box main body in the opened state.

SUMMARY OF THE INVENTION

The invention has been developed in order to effectively resolve the above described problems involved with the lock apparatus of the prior art. According to a first aspect of the invention, a lock apparatus attaches a container member to a support member openably. The lock apparatus includes a operation handle; a pair of springs, which are movably supported by the container member; a pair of slide pins, which are urged in directions of lock holes defined on the support member by the springs, respectively; and a pair of cam members to which rear end portions of the slide pins are fitted, respectively, to urge each slide pin to project and retract. When the operation handle is operated in a swing manner, a front end portion of each slide pin is retracted from each lock hole of the support member against pressure of each spring. Engagement holes are defined on the opposed surfaces of each front end portion of the cam member having a cylindrical portion. Each rear end portion of the slide pin is formed in a bifurcated structure to have elastic pieces. Each of elastic pieces has a protrusion for detachably engaging with each of engagement holes.

According to a second aspect of the invention, on the premise of the first aspect, the rear end portions of the slide pins are connected to the cam members to be swingable.

According to a third aspect of the invention, on the premise of the first or second aspect, a stopper piece is provided between the elastic pieces of each slide pin. An elastic contact piece for elastically contacting with the stopper piece is formed on a surface of each cam member, which corresponds to the stopper piece.

According to a fourth aspect of the invention, on the premise of the third aspect, a rib wall for preventing erroneous assembly is formed on a inner side surface of each cam member, which is opposed to the elastic contact piece of each cam member.

According to a fifth aspect of the invention, on the premise of the first aspect, the lock apparatus further includes an outer cylindrical member continuously formed on one of the operation handle and the slide pin; and an O-ring, which slide-contacts with the outer cylindrical member and the inner cylindrical portion of the cam member simultaneously.

According to a sixth aspect of the invention, on the premise of the fifth aspect, the cylindrical portion of the cam member includes a containing groove to which the O-ring is attached.

According to a seventh aspect of the invention, on the premise of the sixth aspect, the containing groove is formed in an recessed shape to isolate the O-ring.

According to an eighth aspect of the invention, on the premise of the sixth aspect, a cam groove is formed on the cylindrical portion of the cam member. A projected portion is formed on the outer cylindrical member. The projected portion moves in the cam groove. The containing groove communicates with the cam groove.

According to a ninth aspect of the invention, on the premise of the fifth aspect, the outer cylindrical member has a bottom surface. A cam groove is formed on one of the cylindrical portion of the cam member and the outer cylindrical member. A projected portion is formed on the other of the cylindrical portion of the cam member and the outer cylindrical member. The projected portion moves in the cam groove. The projected portion and the cam groove are disposed in a space blocked by the O-ring.

Therefore, in the first aspect, even when the container such as a glove box is destroyed, by only rotating the slide pin relative to the cam member, the projection of the elastic piece is disengaged from the locking hole on the side of the cam member. Therefore, successively, when the slide pin retracted from the cam member, the slide pin can be reused. Due to this fact, also a drive mechanism including the cam member urging the slide pin to project and retract can be removed from the container. Therefore, a drive mechanism including the cam member can also be reused. Further, by easily removing the slide pin, the maintenance is improved.

In the second aspect of the invention, the slide pin is swingably connected. Thereby, in the case of assembling, the lock apparatus can sufficiently deal with the shape of the container and the position of the hole of the container. When a front wall side of the container is constituted by an outer member and an inner member, the both members can be jointed by impulse weld, heat weld and so on easily. In the third aspect, by bringing the elastic piece of the cam member into elastic contact with the stopper piece of the slide pin, rattling of the slide pin can be prevented. In the fourth aspect, by presence of the rib wall for preventing erroneous assembly, erroneous assembly of the pair of left and right slide pins to the cam members can be prevented.

In the fifth aspect of the invention, even when an operator lets go the operation handle after the container member is made in an opening state, the restraining state by the movement conversion mechanism is released. Then, upon receiving the urging spring pressure, the slide pin rapidly projects in a direction of the lock portion together with the inner cylindrical member. However, at this time, the O-ring slide-contacts with the outer cylindrical member and the inner cylindrical member simultaneously to apply restrain force to a relative movement between the outer cylindrical member and the inner cylindrical member. Thereby, it is prevented that stoppers for restraining projection amount collide each other to cause large impact sound. Also, the O-ring is used as a unit for providing the restraining force. Since the O-ring maybe selected from standard products, the lock apparatus is economical. In addition, fluctuation in dimension between the outer cylindrical member and the inner cylindrical member can be absorbed.

In the sixth aspect of the invention, the O-ring can be attached to the containing groove. Thus, the O-ring is surely supported. In the seventh aspect of the invention, the containing groove is formed in a recessed shape to isolate the O-ring. Thus, the O-ring is supported more surely In addition, even if the O-ring is broken, the O-ring is not brought into other portions. In the eighth aspect of the invention, the movement conversion mechanism includes the cam groove and the projected portion and the containing groove communicates with the cam groove Thus, the movement conversion mechanism can be downsized. In the ninth aspect of the invention, the projected portion and the cam groove, which make up for the movement conversion mechanism, are disposed in a space blocked by the O-ring. Thus, it is effectively prevented to cause impact sound.

DETAILED DESCRIPTION OF THE PREFERRED EMBODIMENTS

The invention will be described below based on an illustrated preferable embodiment in details. A lock apparatus according to embodiments of the invention is applicable to a glove box attached openably to an instrument panel of a vehicle The lock apparatus according to the embodiments of the invention is based on the premise that a glove box main body thereof is supported axially at a hollow of the instrument panel.

First Embodiment

Figure 1:
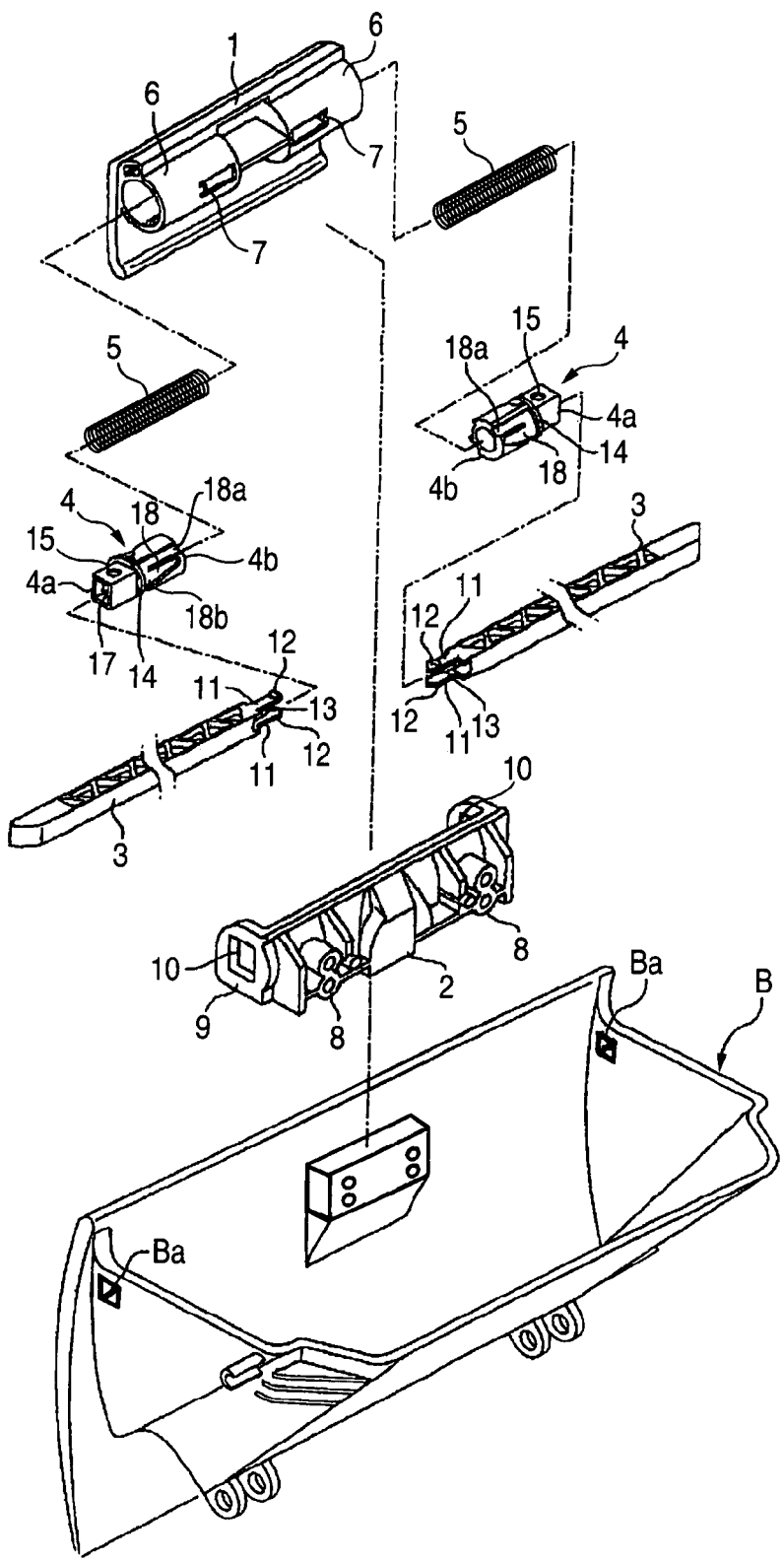
FIG. 1 is an exploded perspective view showing a lock apparatus according to a first embodiment of the invention.

Further, as shown in FIG. 1, a lock apparatus according to a first embodiment includes an operation handle 1, a support frame 2, a pair of left and right slide pins 3, a pair of left and right cam members 4, and two compression coil springs 5. The operation handle 1 is supported to be swingable inside a recessed portion defined in a front wall of a glove box main body. The support frame 2 is used to screw the operation handle 1 to an attachment wall extending to inside of the recessed portion. The cam members 4 urge the slide pins 3 to project and retract, respectively. The compression coil springs 5 urge the slide pins 3 in directions of lock holes defined in an instrument panel, respectively.

Figure 2:
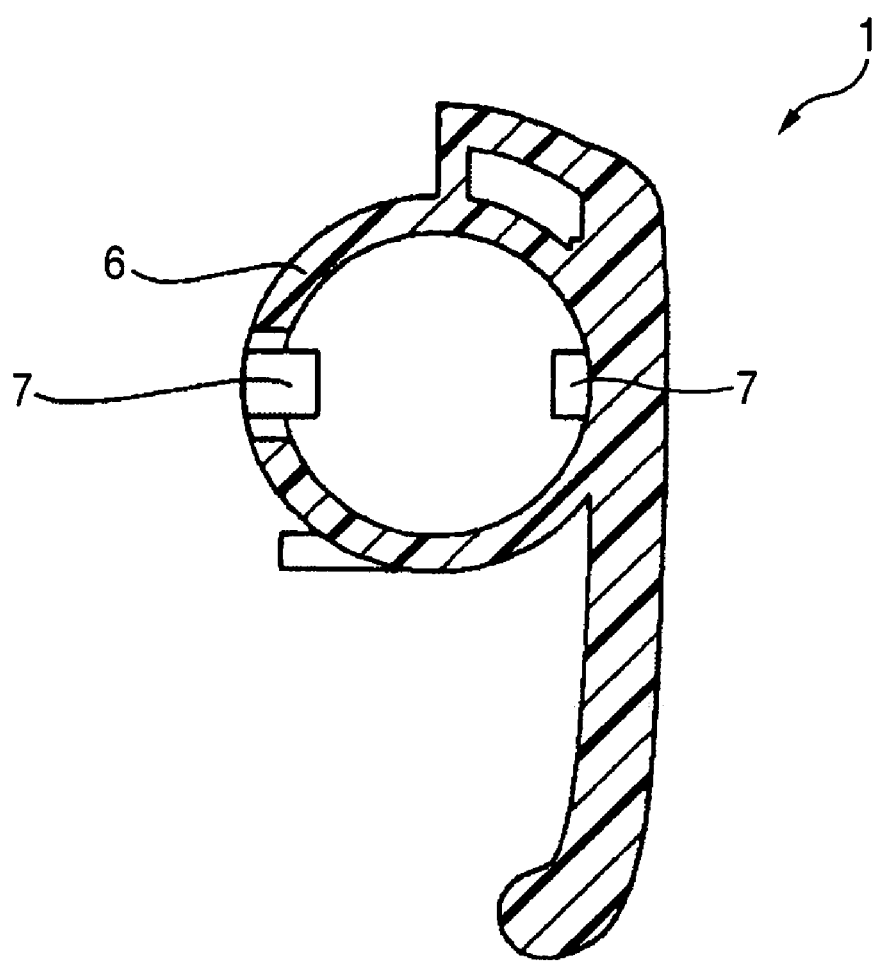
FIG. 2 is a sectional view of an operation handle.

As shown also in FIG. 2, on a rear surface side of the operation handle 1, a pair of left and right cylindrical portions 6 each for containing the slide pin 3 and the compression coil spring 5 are formed integrally. Inner faces of each cylindrical portion 6 opposed to each other are formed thereon a pair of projected portions 7, which move in cam grooves 18 of the cam member 4 described later. The support frame 2 is formed a plurality of screw holes 8 on a rear surface side thereof and is continuously formed bend walls 9 bent to extend in a direction of the cylindrical portions 6 at both side edges thereof. Openings 10 for permitting the front end of the cam member 4 to go in and out the openings 10 are defined at central portions of the bend walls 9, respectively.

Figure 3A:
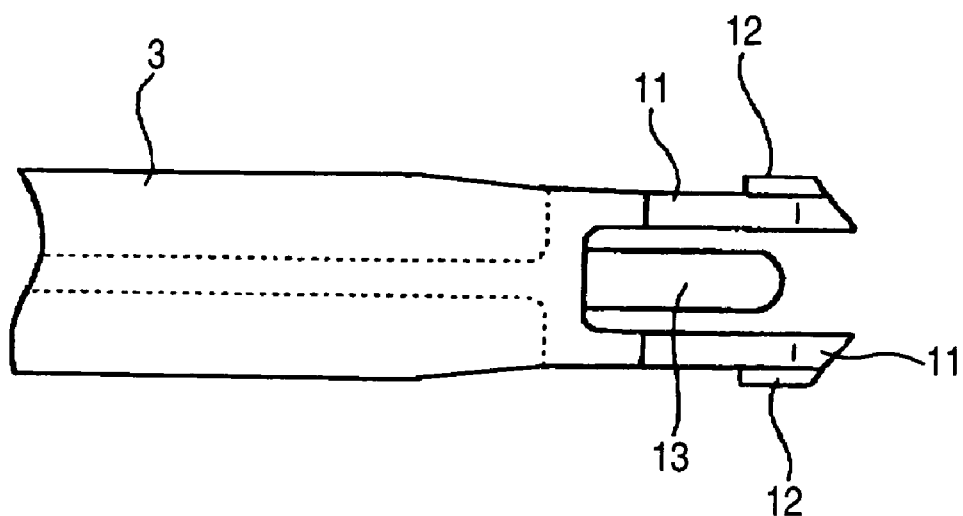
FIG. 3A is a front view enlarging an essential portion showing a structure of a rear end portion of a slide pin and FIG. 3(B) is a side view thereof.
Figure 3B:
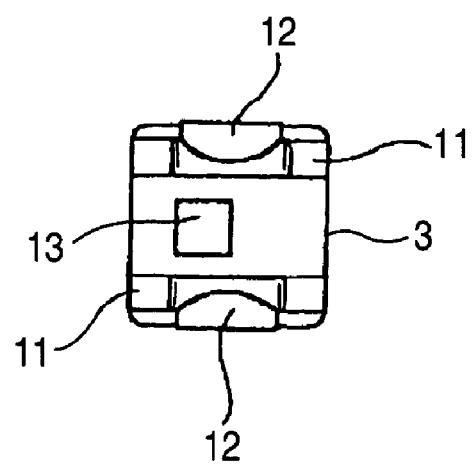
Figure 4A:
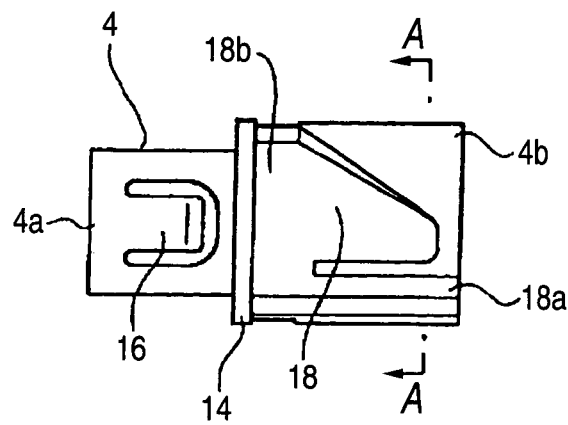
FIG. 4A is a front view of a cam member.
Figure 4B:
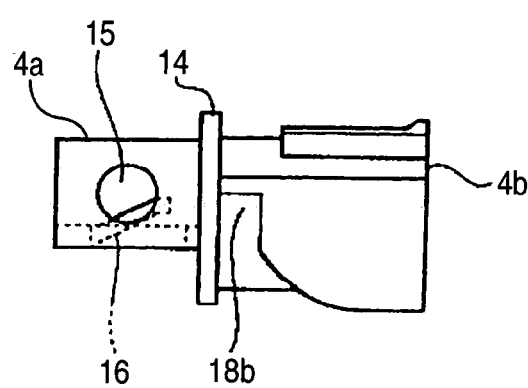
FIG. 4B is a plane view of the cam member.
Figure 4C:
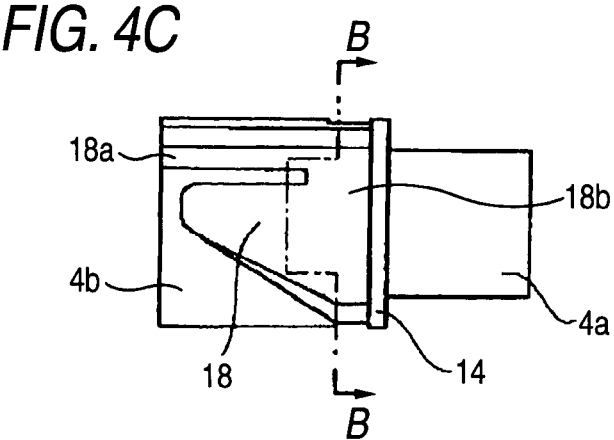
FIG. 4C is a rear view of the cam member.
Figure 4D:
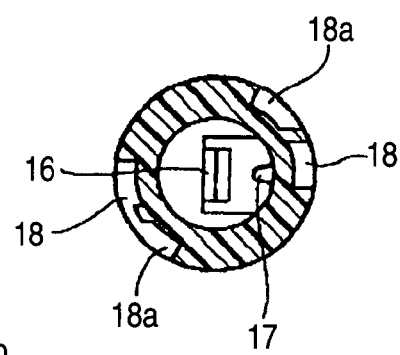
FIG. 4D is a sectional view taken along a line A-A of FIG. 4A
Figure 4E:
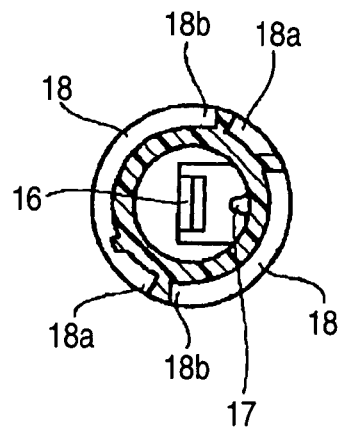
FIG. 4E is a sectional view taken along line B-B of FIG. 4C.

The pair of left and right slide pins 3 are formed symmetrically. Basically, as shown in FIG. 3, a rear end portion thereof has a bifurcated structure of elastic pieces 11 formed with parallel. Each elastic piece 11 is formed on an outer surface thereof a projection 12 detachably engaged with a locking hole 15 of the cam member 4 described later. A stopper piece 13 for being brought into elastic contact with an last contact piece 16 of the cam member 4, described later, is provided between the elastic pieces 11, with being offset from a center by a predetermined distance.

Further, the cam member 4 is formed symmetrically. Basically, as shown in FIG. 4, a front end portion of the cam member 4 is formed in a square tubular shape and a rear end portion of the cam member 4 is formed in a cylindrical shape. A flange portion 14 is a boundary between the front and rear end portions of the cam member 4. The front end portion 4a having the square tubular shape is formed the locking holes 15 detachably engaging with the projections 12 of the slide pin 3 on upper and lower side surfaces of the square tubular shape, and is formed the elastic contact piece 16 brought into elastic contact with the stopper pieces 13 on one of the other pair of opposed side surfaces of the square tubular shape, and is formed a rib wall 17 on an inside of rest of the side surface of the square tubular shape for preventing erroneous assembly.

Further, the rear end portion 4b having the cylindrical shape is formed a pair of the cam grooves 18 having the same shape on an outer periphery thereof. When the projected portion 7 formed on the inner surface of the cylindrical portion 6 is moved along a groove edge of the cam groove 18, the cam member 4 itself is projected and retracted within the cylindrical portion 6 in response to a swing operation of the operation handle 1. Further, the cam groove 18 includes a guide portion 18a for guiding the projected portion 7 Into the cam groove 18 and a lock portion 18b for locking the cam member 4 at a position of retracting the cam member 4 into the cylindrical portion 6.

Figure 5:
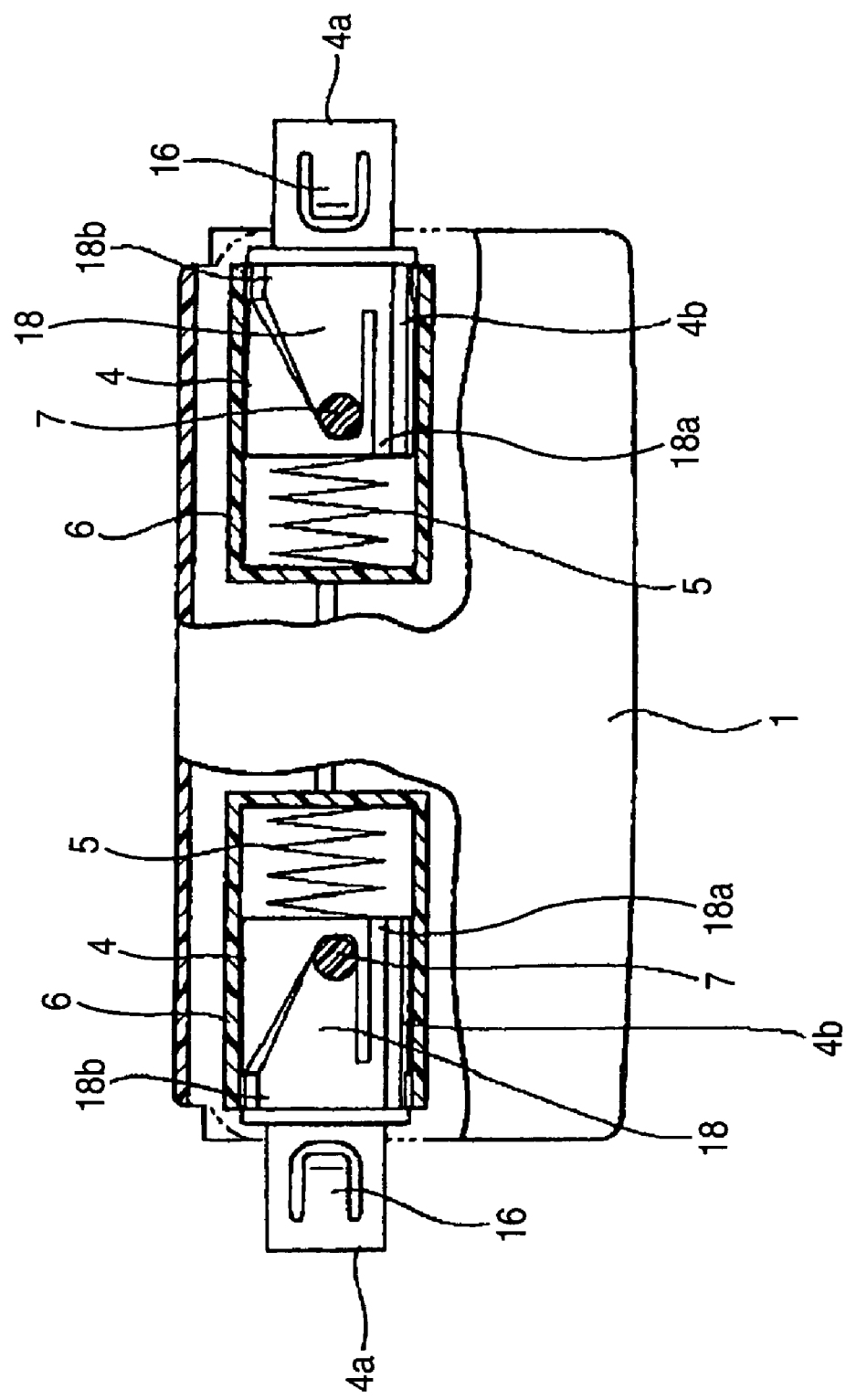
FIG. 5 is a rear view partially cut away to show a state in which the cam member is contained in a cylindrical portion of the operation handle and a front end portion thereof having a square tubular shape is outwardly projected by a compression coil spring.

Therefore, when the lock apparatus having such a configuration is assembled, first, the left and right compression coil springs 6 and the left and right cam member 4 are individually contained in the respective cylindrical portions 6 on the operation handle 1. In this case, the rear end portions 4b having the cylindrical shape of the cam member 4 are pushed into the cylindrical portions 6 while facing the corresponding projected portions 7 to insides of the guide portions 18a of the pair of cam grooves 18 formed on the outer peripheries of the rear end portions 4b having the cylindrical shape of the cam member 4 and rotated the cam member 4 in a predetermined direction. Thereby, the projected portion 7 are engaged with the cam grooves 18 As a result, as shown in FIG. 5, the respective left and right cam member 4 are urged by spring pressure of the respective compression coil springs 5 in a state of projecting the front end portions 4a having the square tubular shape to outside.

Figure 6:
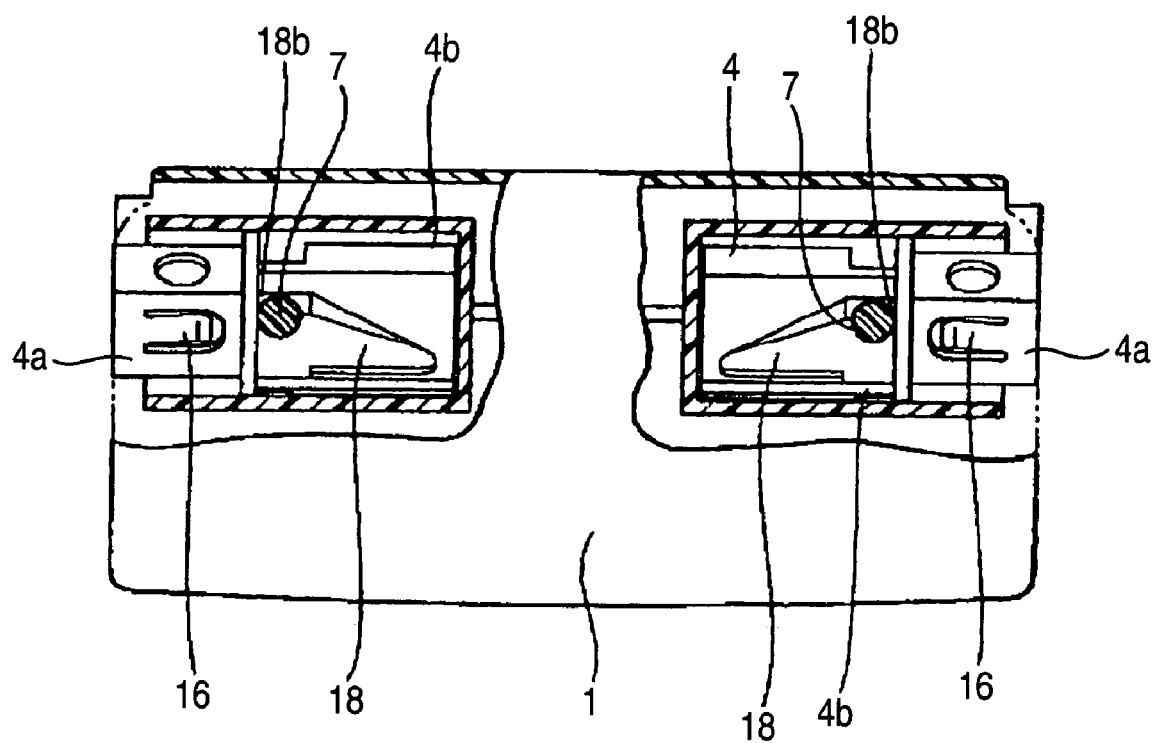
FIG. 6 is a rear view partially cut way to show a state in which the cam member is retracted into the cylindrical portion of the operation handle against spring pressure of the compression coil spring.
Figure 7:
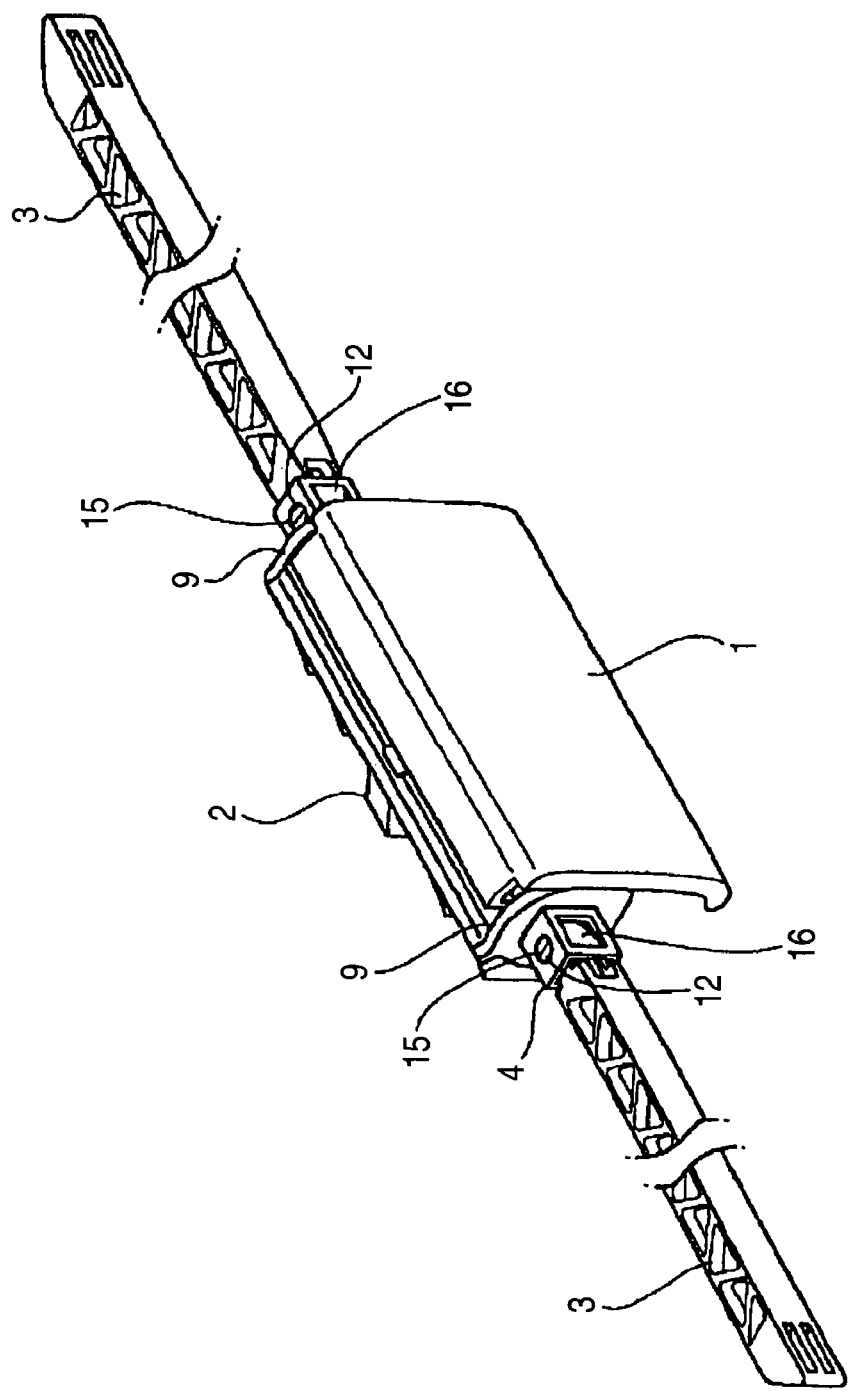
FIG. 7 is a perspective view showing a state of assembling a lock apparatus.
Figure 22:
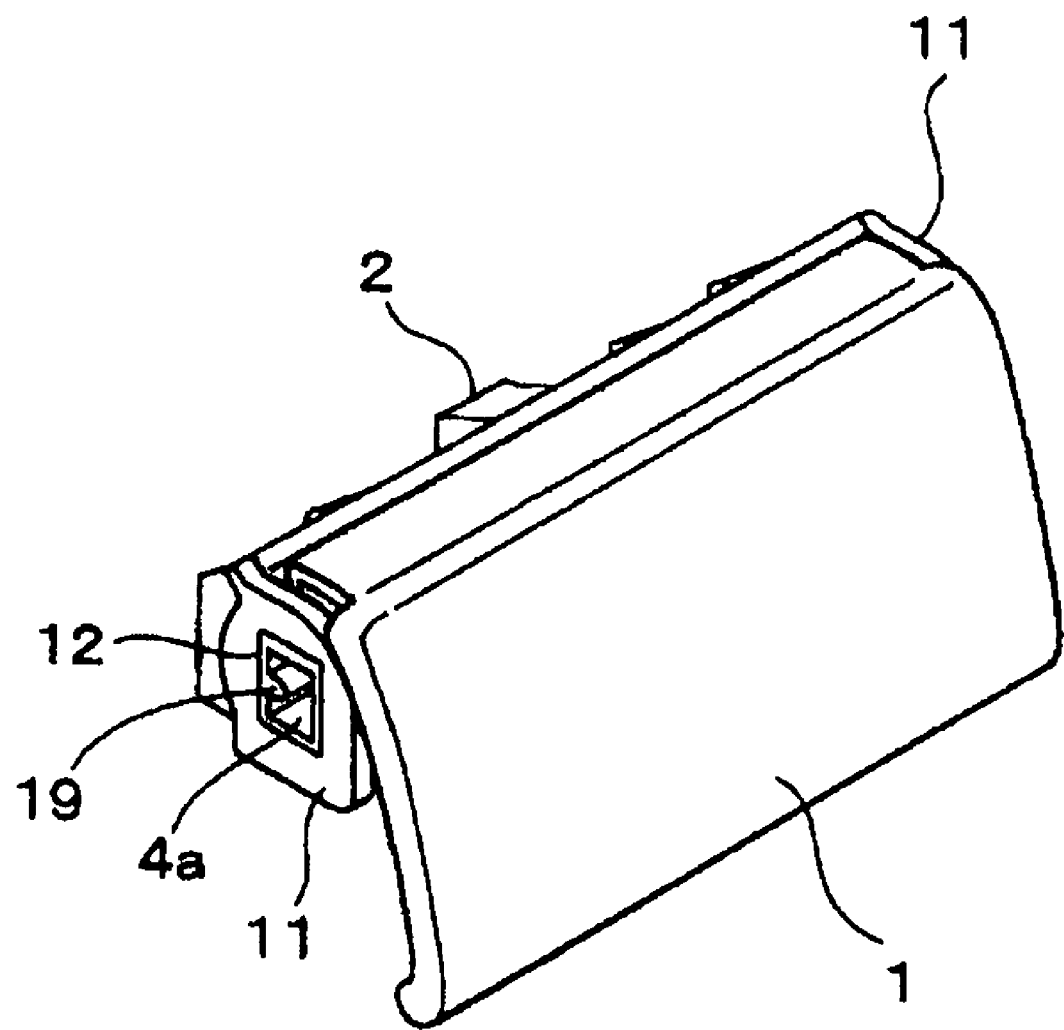
FIG. 22 illustrates a drive mechanism in accordance with an exemplary embodiment of the present invention.
Figure 23:
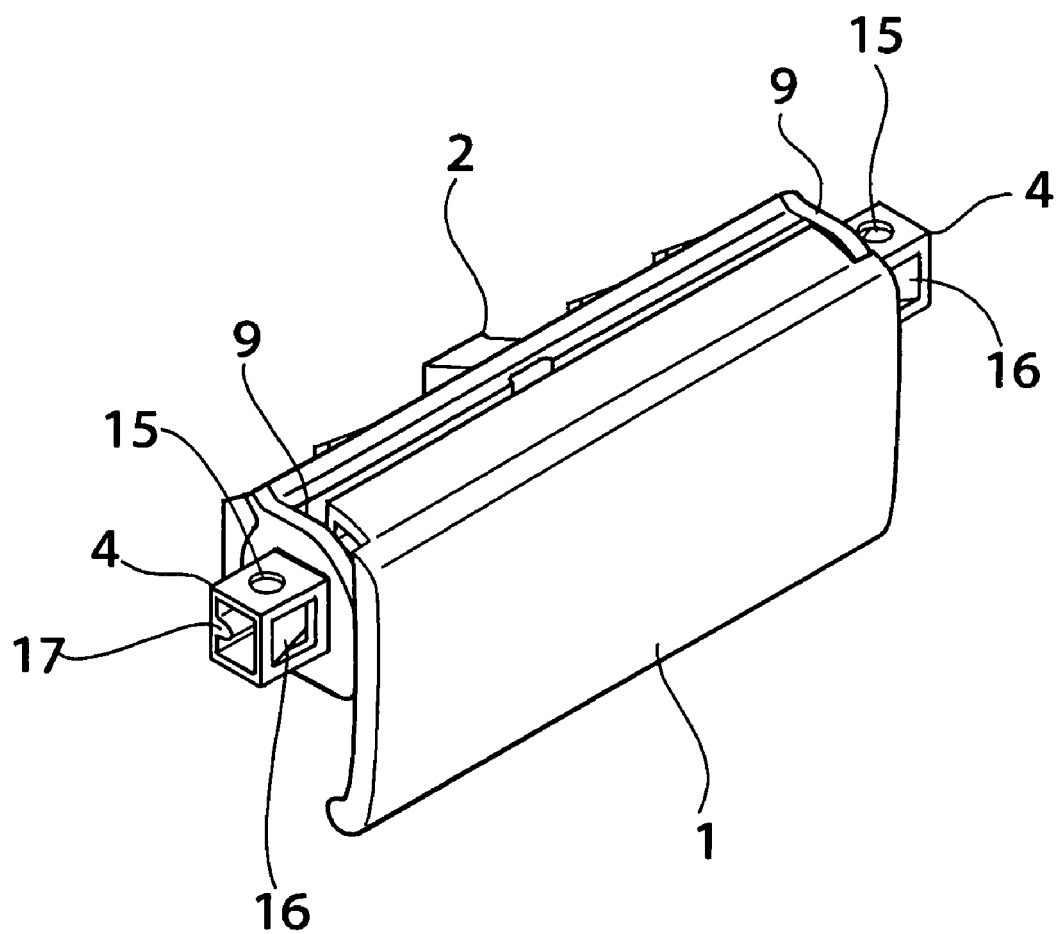
FIG. 23 illustrates the drive mechanism under a certain condition in accordance with an exemplary embodiment of the present invention.

Successively, at this time, the support frame 2 is mounted on the operation handle 1 under this state. In this case, when the respective cam members 4 are pushed while rotating and the projected portions 7 engaged with the cam grooves 18 are shifted to the lock portions 18b of the cam grooves 18 against spring pressure of the compression coil springs, the entire cam members 4 are substantially contained in the cylindrical portions 6 as shown in FIG. 6. This reduces a protruded length of the front end portion 4a of the cam member 4, which is formed in a rectangular cylindrical shape, from the cylindrical portion 6 of the operational handle 1. Then, the support frame 2 is fitted to cover the rear surface side of the operation handle 1 under the containing state, so that six components including the operation handle 1, the pair of cam members 4, the pair of compression coil springs 5, and the support frame 2, are integrated as shown in FIG. 22 to configure a drive mechanism (discussed below) of the six components. When the cam members 4 are recovered to the original state, the rectangular-cylindrical-shaped front end portion 4a protrudes from the cylindrical portion 6 to go through the opening 10, which is provided in the bent wall 9 of the support frame 2, thereby realizing a condition a shown in FIG. 23. The drive mechanism of this condition is easy to handle because it does not break into pieces due to vibration during transportation, further assembling work and the like. When the rear end portions of the slide pin 3 are fitted to the front end portions 4a of the respective cam member 4 having the cylindrical shape. Thereby, the lock apparatus as shown in FIG. 7 is achieved. At this time, the left and right slide pins 3 are not erroneously assembled. If an operator tries to assemble the slide pin 3 in a erroneous manner, the stopper pieces 13 of the slide pin 3 is brought into contact with the rib wall 17 for preventing erroneous assembly.

In such a state, when the rear end portions of the slide pins 3 are fitted to the front end portions 4a having the square tubular shape of the cam member 4, the projections 12 formed on the elastic pieces 11 of the slide pins 3 having the bifurcated shape are engaged with the locking holes 15. Therefore, the slide pins 3 are prevented to be drawn out from the cam member 4. Simultaneously, the slide pins 3 are connected with the cam member 4 so as to be swingable because the engagement between projections 12 and locking holes 15 play role as pivot. Further, under this state, the elastic contact pieces 16 on the cam members 4 are brought into elastic contact with the stopper pieces 13 provided between the elastic pieces 11. Therefore, although the slide pin 3 is swingable, the rattling thereof is effectively prevented.

Figure 8:
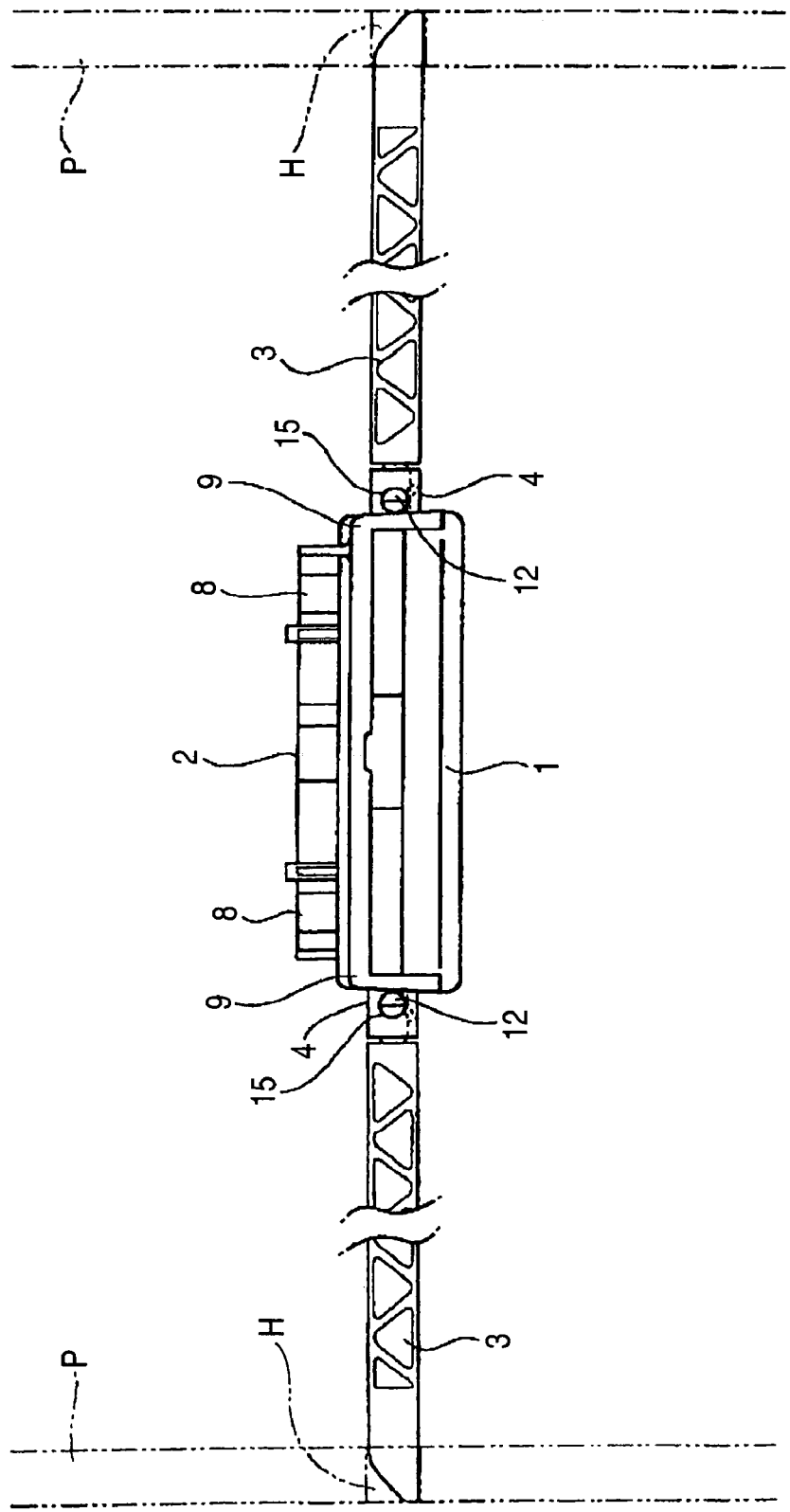
FIG. 8 is a plane view showing a state in which a front end portion of the slide pin is engaged with a lock hole of an instrument panel.

The support frame 2 is screwed on the attachment wall extending to the inside of the recessed portion of the instrument panel while passing the front end portions of the respective slide pins 3 to through holes Ba formed on side surfaces of the glove box main body B. Thereby, the operation handle 1 is rotatably supported on the recessed portion. Accordingly, the lock apparatus can be subjected to actual use. In a state where the operation handle 1 is not operated to swing, as shown in FIG. 8, the pair of left and right slide pins 3 are projected by urge spring pressure to engage with the lock holes H of the instrument panel P. Therefore, the glove box main body B is locked in the closed state.

Figure 9:
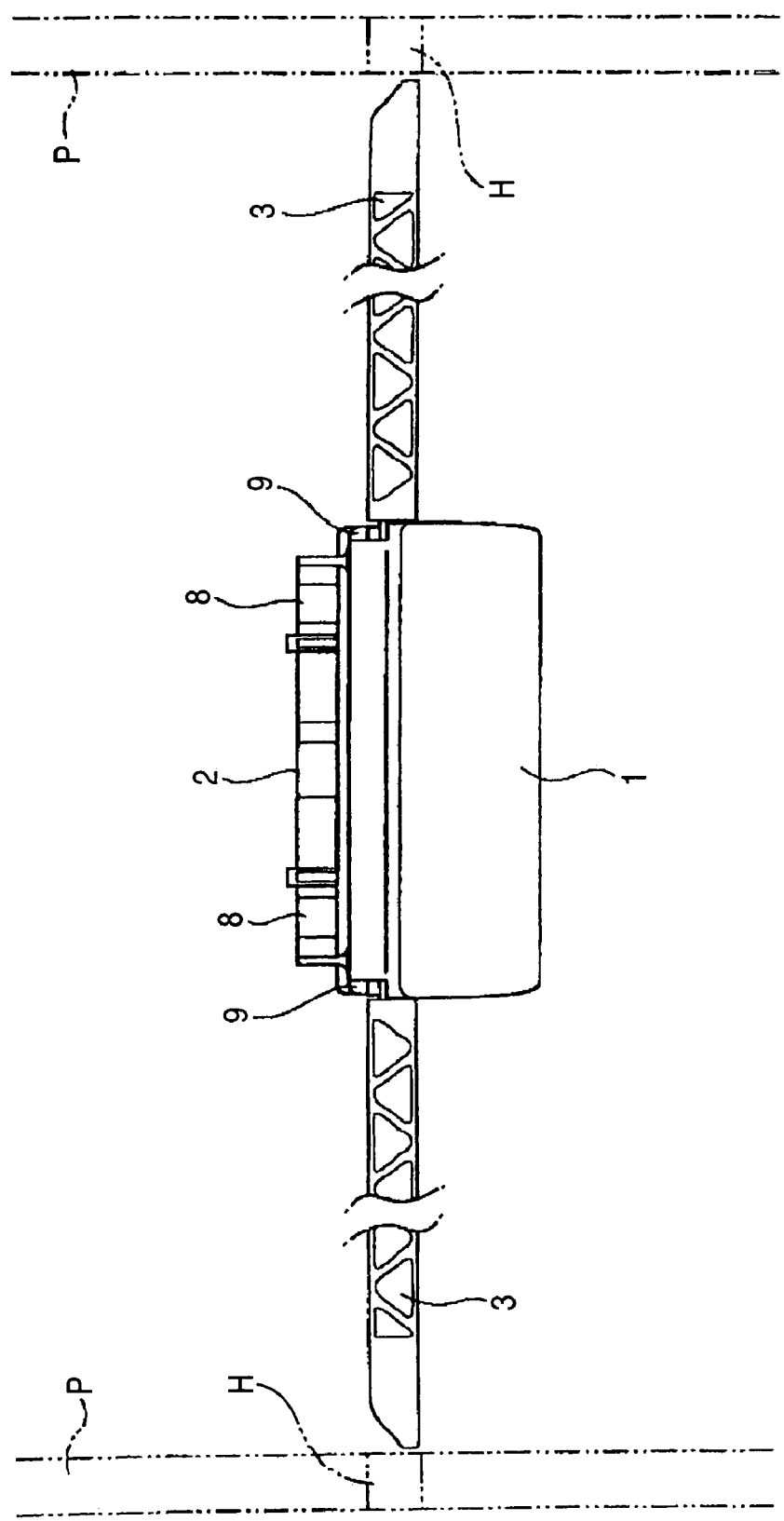
FIG. 9 is a plane view showing a state in which the front end portion of the slide pin is retracted from the lock hole of the instrument panel.

Further, in the case that a locked state is released, the operation handle 1 is held and pulled up. Thereby, the projected portions 7 in the cylindrical portions 6 are moved along the groove edges of the corresponding cam grooves 18 to retract the cam members 4 into the cylindrical portions 6. Therefore, as shown in FIG. 9, the front end portions of the respective slide pins 3 are retracted from the lock holes H of the instrument panel P and the glove box main body is permitted to rotate in the opening direction.

Figure 10A:
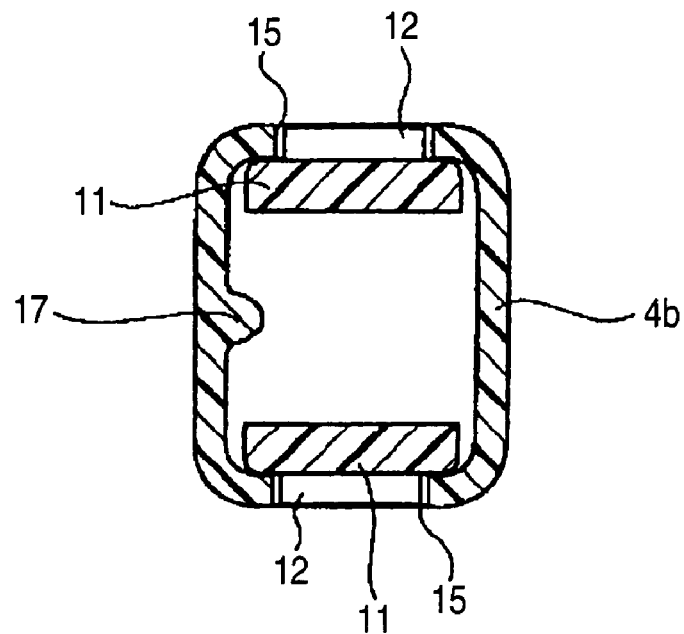
FIG. 10A is showing a state in which a projection of the slide pin is locked by a locking hole of the cam member and FIG. 10(B) is showing a state in which the slide pin is rotated to thereby disengage the projection thereof from the locking hole of the cam member.
Figure 10B:
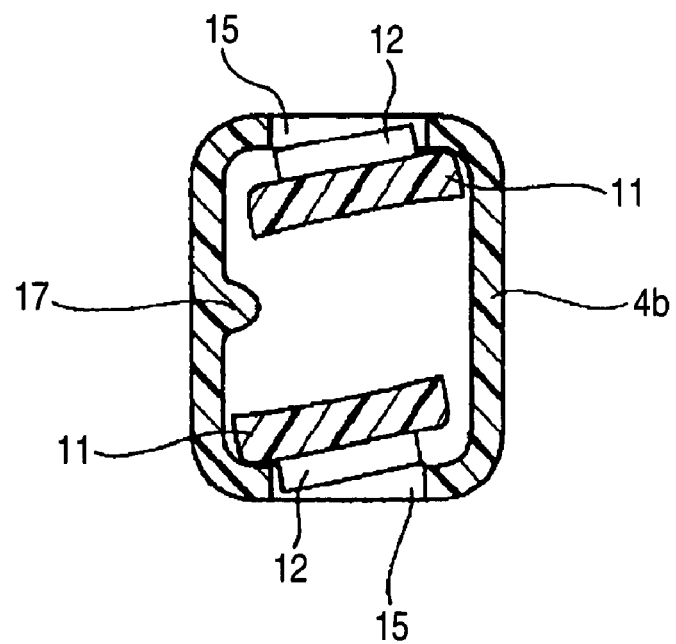

Further, even when the glove box main body B is broken in such a using state, as shown in FIG. 10, by only rotating the slide pin 3 relative to, the cam member 4, the projection 12 of the elastic piece 11 is detached form the locking hole 15 on the cam member 4. Therefore, when the slide pin 3 is removed from the cam member 4, it is needless to say that the slide pin 3 can be reused. Due to this fact, releasing to screw the support frame 2 on the attached wall, a drive mechanism including the cam member 4 urging the slide pin 3 to project and retract can also be detached from the glove box main body B. Therefore, the drive mechanism including the cam member 4 can also be reused. Further, by easily removing the slide pin 3, maintenance thereof is also easy. When a cylinder lock provided at a vicinity of the operation handle 1 or the support frame 2 is reused, it is not necessary to destroy the operation handle 1 or the support frame 2.

As described above, according to the first embodiment of the invention, with the above-described configuration, even when the container such as the glove box is broken, by only rotating the slide pin relative to the cam member, the projection of the elastic piece is detached from the locking hole on the cam member. Therefore, it is needless to say that when the slide pin is removed from the cam member, the slide pin can be reused. Due to this fact, the drive mechanism including the cam member for urging the slide pin to project and retract can also be removed from the container. Therefore, a drive mechanism including the cam member can also be reused. Further, by easily removing the slide pin, maintenance thereof is also easy.

Second Embodiment

Figure 11:
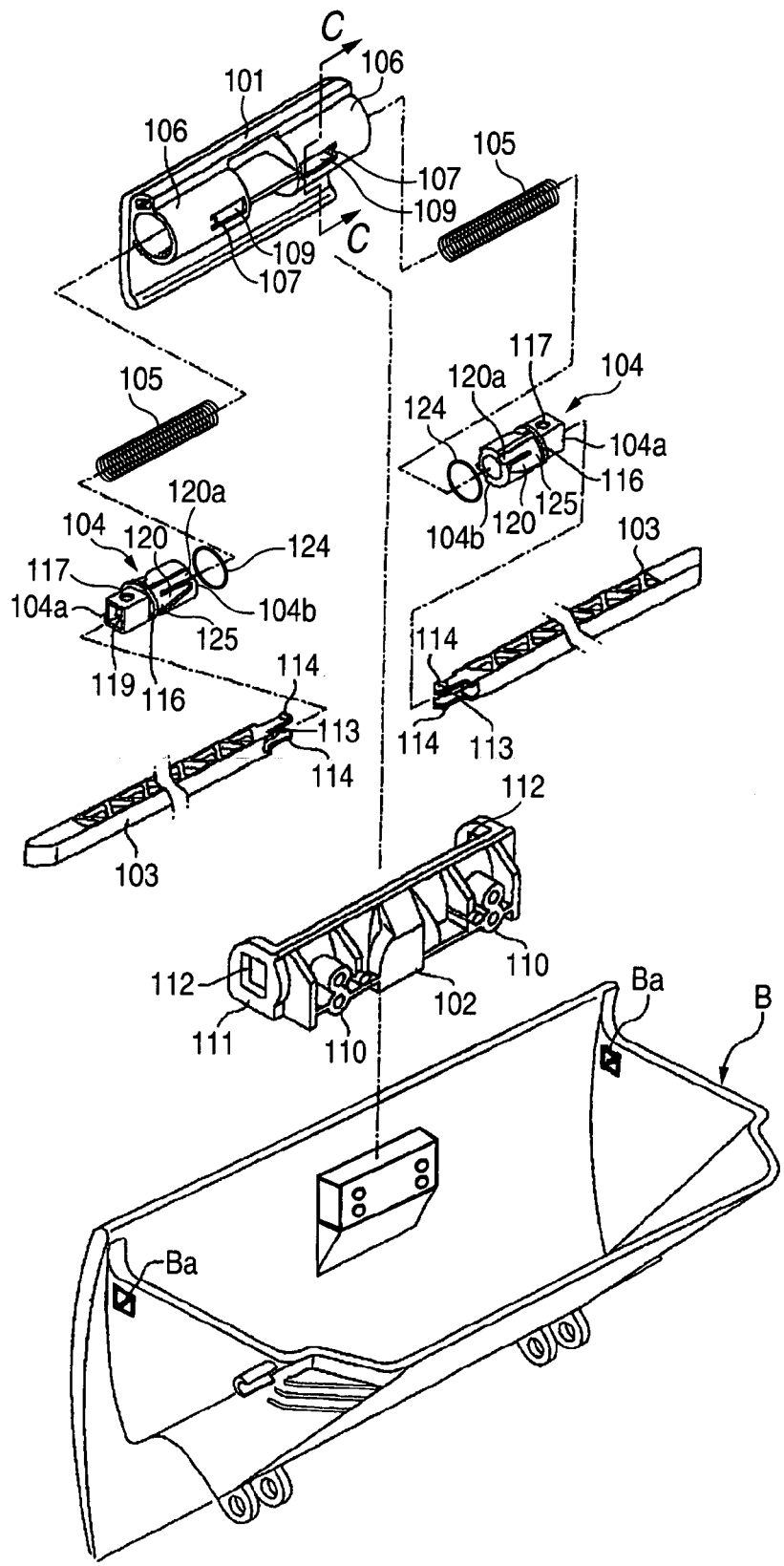
FIG. 11 is an exploded perspective view to show a lock apparatus according to a second embodiment of the invention

As shown in FIG. 11, a lock apparatus according to a second embodiment includes an operation handle 101, a support frame 102, a pair of left and right slide pins 103, a pair of left and right cam members 104, two compression coil springs 105, and O-rings 124. The operation handle 101 is disposed inside a recessed portion defined in a front wall of a glove box main body to open and close the glove box main body. The support frame 102 is screwed on an attachment wall extending to inside of the recessed portion and supports the operation handle 101 to be swingable. The cam members 104 urge the slide pins 103 to project and retract, respectively. The compression coil springs 105 urge the slide pins 103 in directions of lock holes defined in an instrument panel, respectively. The O-rings 124 are attached to the cam members to proved a braking force described later.

Figure 12:
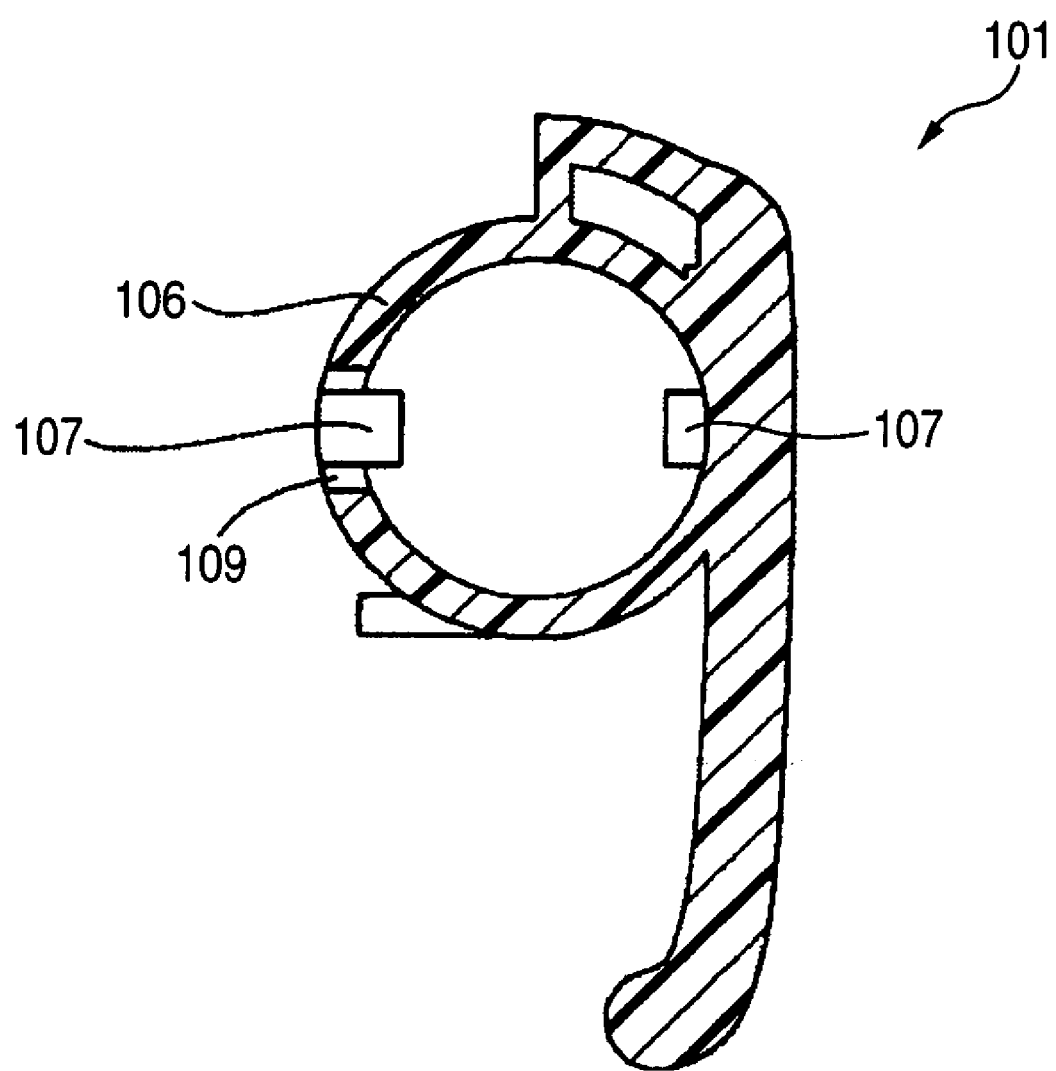
FIG. 12 is a sectional view taken along a line C-C of an operation handle in FIG. 11.

Also as shown in FIG. 12, on a back surface side of the operation handle 101, a pair of left and right cylindrical portions 106, which have bottom plates and serve as outer cylindrical members, are formed integrally. Each of cylindrical portions 106 can contain the cam member 104 and the compression coil spring 105. A pair of projected portions 107 moving in cam grooves 120 of the cam member 104, described later, are formed on inner surfaces of each cylindrical portion 106 In the case of forming each projected portions 107 having a cylindrical shape, slits 109 are formed in a longitudinal direction of each cylindrical portion 106. Then, one of the projected portions 107 is formed on an edge of an inner periphery of an opening of the slits 109 and the other of the projected portion 107 is formed on an inner surface of the cylindrical portion 106 to be opposed to the one projected portion 107. It is noted that the projected portions 107 and the cam grooves 120 cooperate with each other to serve as a motion conversion mechanism for converting a swing motion of the operation handle 101 into linear motions of the slide pins 103, as described later.

Particularly, since the above-described operation handle 101 is adopted in the second embodiment, it becomes possible to form the projected portions 107 in the following manner. A semi-cylindrical shape constituting a half of the one of the projected portions 107 having the cylindrical shape is formed on the periphery edge of the slit 109. Thereby, a first die having a contour shape of the slit 109 in the cross section thereof is moved in a direction intersecting with the inner surface of the cylindrical portion 106. In addition, a second die is moved in an axial direction of the cylindrical portion 106. The second die has a contour shape of the inner surface of the cylindrical portion 106 in the cross section thereof, includes a projected portion of a semicircular shape at an end surface thereof, and has a groove of a semicircular shape at a ridge line portion thereof when the semicircular shape of the first die and the projected portion of the second die having the semicircular shape are engaged with each other, a groove having a cylindrical shape is defined on the inner surface of the cylindrical portion 106 by the first die and the second die. This groove having the circular shape molds the one projected portion 107. Therefore, it becomes possible to form the cylindrical portion 106 and the one projected portion 107 simultaneously.

Further, the other projected portion 107 is disposed at the opposed position of the inner surface of the cylindrical portion 106. A groove having a semicircular shape, which constitutes a half of the other projected portion 107, is formed on the edge surface of the first die. A groove having a semicircular shape, which is located symmetrically with respect to a center axis line of the cylindrical portion 106, is formed on the ridge line portion of the second die. When the semicircular shape of the first die and the projected portion of the second die having the semicircular shape are engaged with each other, two grooves of a circular shape are formed at opposed positions of the cylindrical portion 106. Therefore, the other projected portion 107 is formed simultaneously.

Accordingly, in the second embodiment, the pair of projected portions 107 arranged as described above and the operation handle 101 are formed simultanenesly The center axis of the cylinder of the one projected portion 107 and the center axis of the cylinder of the other projected portion 107 overlap each other. Therefore, the center axes of the circular cylinders of the pair of projected portion 107 are orthogonal to the center axis of the cylindrical portion 106. As a result, the outer periphery of the cylinder of the projected portion 107 becomes in parallel with the cam groove 120 of the cam member 104, described later. Therefore, the projected portion 107 can smoothly slide on the cam groove 120.

The support frame 102 is formed a plurality of screw holes 110 on a rear surface thereof and is continuously formed bend walls 111 bent to extend in a direction of the cylindrical portions 106 at both side edges thereof. Openings 112 for permitting front end of each cam member 104 to go in and out are defined at central portions of the bend walls 111, respectively.

Figure 13A:
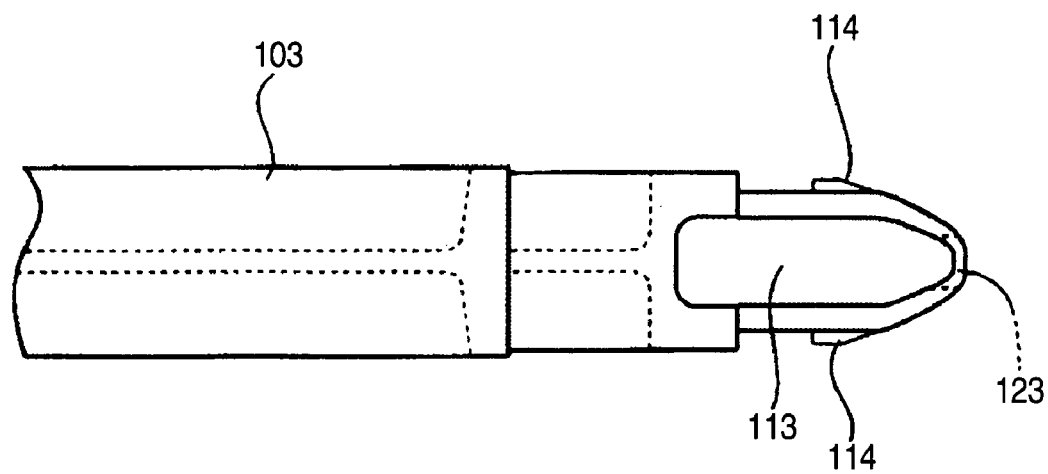
FIG. 13A is a front view enlarging an essential portion showing a structure of a rear end portion of the slide pin and FIG. 13B is a side view thereof.
Figure 13B:
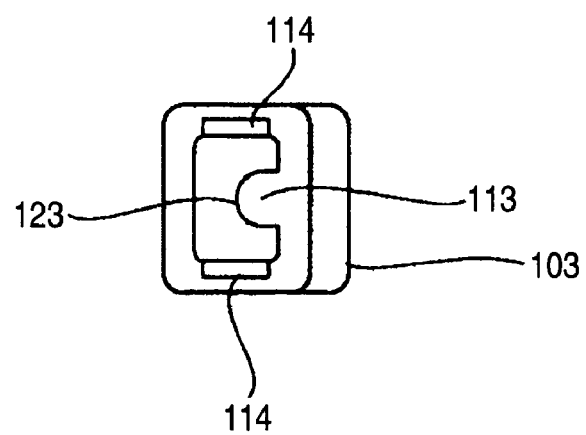
Figure 14A:
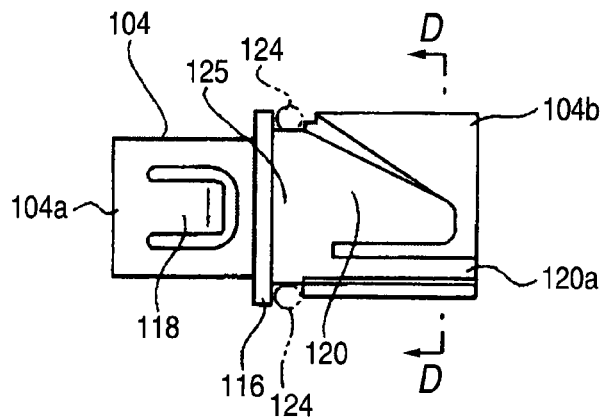
FIG. 14A is a front view of the cam member.
Figure 14B:
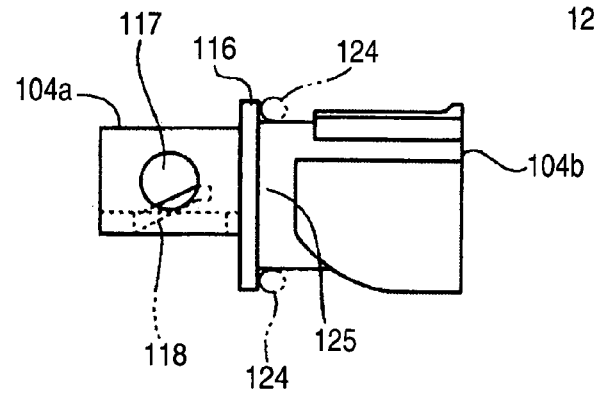
FIG. 14B is the plane view of the cam member.
Figure 14C:
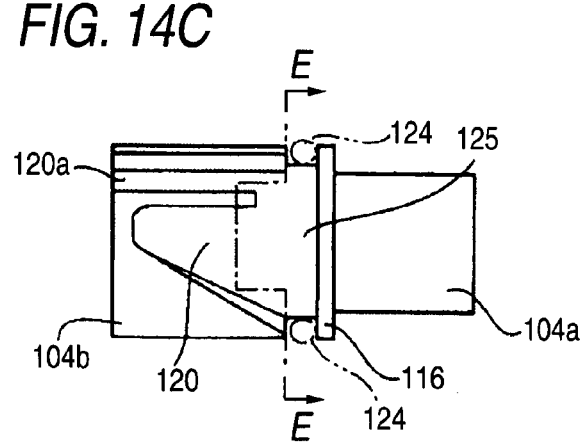
FIG. 14C is a rear view of the cam member.
Figure 14D:
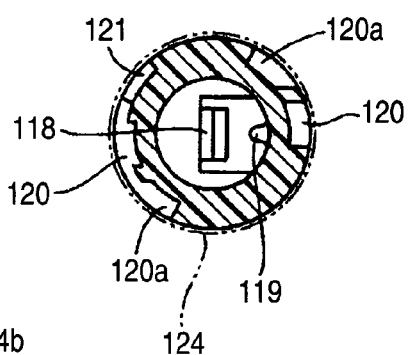
FIG. 14D is a sectional view taken along a line D-D of FIG. 14A
Figure 14E:
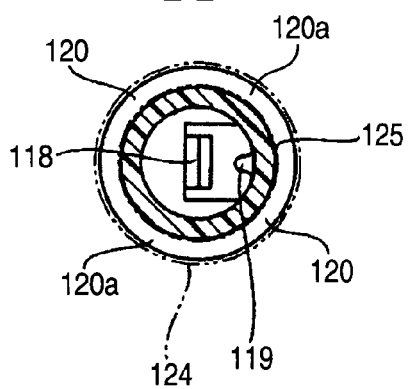
FIG. 14E is a sectional view taken along a line E-E of FIG. 14C.

The pair of left and right slide pins 103 are formed symmetrically each other. Basically, as shown in FIG. 13, a through hole 113 for engaging with a connection piece 118 of the cam member 104, described later, is formed at a rear end portion of the slide pins 103. Also, projections 114 for engaging with locking holes 117 of the cam member 104, described later, are formed on outer surfaces of upper and lower walls, which define the through hole 113, respectively. Further, when the operation handle 101 is arranged at center of the clove box main body B, shape of the respective left and right slide pins 103 are the same. However, when the operation handle 101 is arranged to offset to either of left and right sides, the shapes of the left and right slide pins 103 are not the same. Therefore, on the side surface of the rear end portion thereof a recessed groove 123 is formed for preventing erroneous assembly of the left and right slide pins 103 when the slide pins 103 are assembled. Further, a front end portion of the slide pin 103 includes an inclined surface to facilitate to engage the slide pin 103 with a lock hole provided on the instrument panel when the glove box main body B is rotated to the direction of the instrument panel. Therefore, the slide pin 103 itself includes an assembly direction and the above-described recessed groove 123 operates effectively for preventing erroneous recognition of the assembly direction.

The cam members 104 are formed symmetrically. Basically, as shown in FIG. 14, a front end of the cam member 104 is formed in a square tubular shape and a rear end of the cam member 104, which serves as an inner cylindrical member, is formed in a cylindrical shape. A flange portion 116 is a boundary between the front and rear end sides of the cam member 104. The front end portion 104a having the square tubular shape is formed the locking holes 117 detachably engaging with the projections 114 of the slide pin 103 on upper and lower side surfaces of the square tubular shape, and is formed the connection piece 118 for engaging with the through hole 113 on one of the other pair of opposed side surfaces of the square tubular shape, and is formed a rib wall on an inside of rest of the side surface for preventing erroneous assembly.

Further, a rear end portion 104b having the cylindrical shape is formed the cam groove 120 having a substantial right triangle shape and a guide groove 120a in parallel with the axis line of the cam member 104 on an outer periphery thereof. The cam groove 120 and the guide groove 120a are formed to have the same depth with partitioned by a wall. A path for communicating the cam groove 120 with the guide groove 120a is defined in the vicinity of the flange portion 116. The guide groove 120a reaches an end face of the rear end portion 104b of the cylindrical shape. When the cam member 104 is moved in the axis line direction, the above-described projected portion 107 is brought from the side of the end face into the guide groove 120a and passes through the path and is introduced into the cam groove 120 having the substantial right triangle shape. After assembling the lock apparatus, when the operation handle 101 is held and pulled up, the projected portion 107 is moved in a sliding contact state along a groove edge of the oblique side of the substantial right triangle shape forming the cam groove 120. Further, the rear end portion 104b of the cylindrical shape is also formed the cam groove 120 and the guide groove 120a similar to the above-described at a position rotated by 180° around the axis line. Therefore, the pair of projected portion 107 are introduced into the corresponding cam grooves 120.

Figure 20:
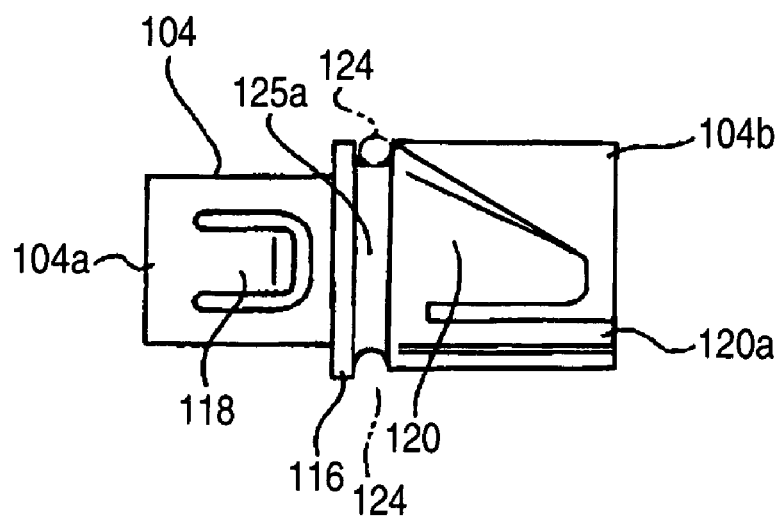
FIG. 20 shows a circular recessed groove 125a of the cam member 104.
Figure 21:
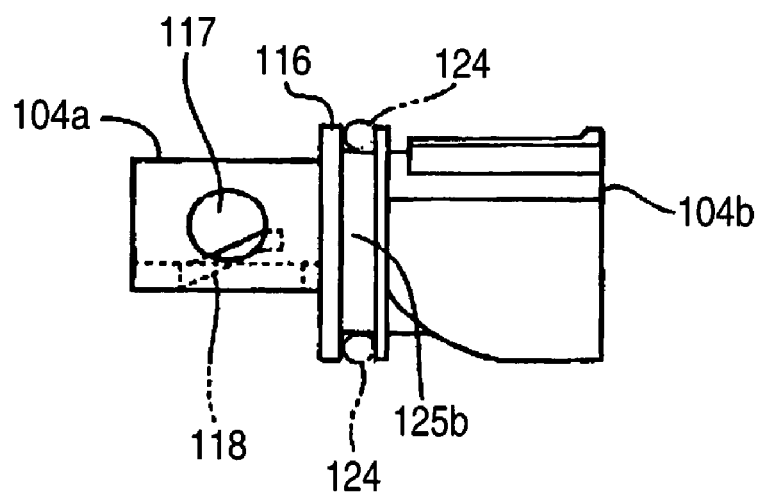
FIG. 21 shows a recessed groove 125b, which can isolate the O-ring 124, of the cam member 104.

Further, in the rear end portion 104b having the cylindrical shape, a part of a wall defining the oblique side of the groove edge of each cam groove 120 is cut off to form a containing groove 125 for mounting the O-ring 124 on a root side of the flange portion 116. Thereby, the containing groove 125 is communicated with the cam groove 120. However, the invention is not limited to this example. As shown in FIG. 20 and FIG. 21, the containing groove 125 may be formed to be a circular recessed groove 125a or a recessed groove 125b having a ring-like shape capable of isolating the O-ring 124 arbitrarily in accordance with the embodiment. Particularly, in the case of the recessed groove 125b having a ring-like shape, there is no fear that the O-ring 124 is detached from the containing groove 125 having the recessed shape. Even when the O-ring 124 is broken, there is no fear that the broken O-ring 124 is brought to other portion and that the O-ring is twisted when the braking force is exerted. At any rate, by forming the containing groove 125 at the rear end portion 104b having the cylindrical shape of the cam member 104, the cam member 104 including the rear end portion 104b having the cylindrical shape can be downsized.

In addition, although the operation handle 101 according to the second embodiment is not provided with a cylinder lock, an operation handle maybe provided with a cylinder lock between the pair of cam members 104. In this case, the pair of cam members 104 and the cylinder lock are arranged to be offset from each other in upper and lower directions.

Figure 15:
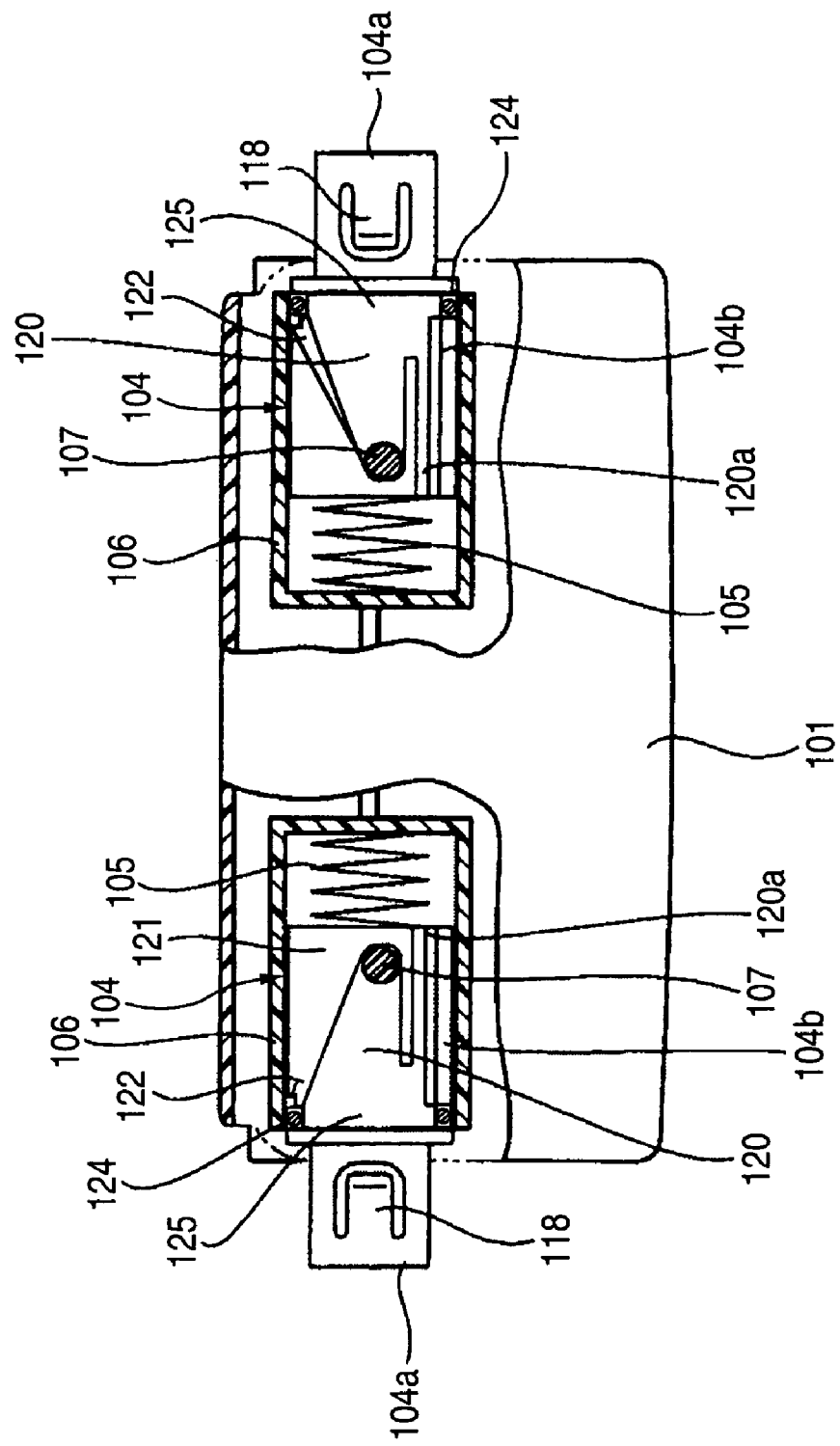
FIG. 15 is a rear view partially cut away showing a state in which the cam member is contained in a cylindrical portion of the operation handle and a front end portion thereof having a square tubular shape is outwardly projected by a compression coil spring.

Accordingly, in the case of assembling the lock apparatus having such a configuration, first, the O-rings 124 is mounted in the respective containing grooves 125 of the cam members 104. Under this state, the left and right compression coil springs 105 and the left and right cam members 104 are individually inserted into the respective cylindrical portion 106 of the operation handle 101. In this case, the rear end portion 104b having the cylindrical shape of the cam member 104 is pushed into the cylindrical portion 106 while facing the corresponding projected portions 107 to the guide grooves 120a of the pair of cam grooves 120 formed at the outer periphery of the rear end portion 104b having the cylindrical shape of the cam member 104, and is rotated in a predetermined direction. Thereby, the projected portion 107 are engaged with the cam grooves 120. As a result, as shown in FIG. 15, the respective left and right cam member 104 are urged to project the front end portions 104a having the square tubular shape to outside by spring pressure of the respective compression coil springs 105.

Successively, at this time, the support frame 102 is assembled to the operation handle 101 under this state In this case, when the respective cam member 104 are pushed into the cylindrical portions 106 linearly and the support frame 102 are fitted to cover the rear face side of the operation handle 101, the support frame 102 is assembled to the operation handle 101.

Therefore, successively, when the support frame 102 is screwed on the attaching wall extending at inside of the recessed portion of the glove box main body B under this state, the operation handle 101 is swingably supported on the recessed portion.

After the support frame 102 is screwed on the attaching wall, when the operation handle 101 in an opened state is closed, a state of pulling the cam member 104 into the cylindrical portion 106 is released and the front end portions 104a having the square tubular shape of the cam member 104 are outwardly projected from the openings 112 of the support frame 102. Therefore, successively, when the front end portions 104a having the square tubular shape of the respective cam member 104 are fitted to the rear end portions of the respective left and right slide pins 103, the lock apparatus is assembled. At this time, the rib wall 119 for preventing erroneous assembly can be inserted into the recessed groove 123 defining the through hole 113 of the guide pin 3 by fitting. Even when the left and right slide pins 103 are inserted there into erroneously with wrong inserting directions, a side wall of a wall portion which is not provided with the recessed groove 123 is brought into contact with the rib wall 119 and the insertion cannot be carried out. Therefore, the left and right slide pins 103 are not erroneously assembled.

Further, in such a state, when the rear end portion of the slide pin 103 is engaged with the front end portion 104a having the square tubular shape of the cam member 104, the projections 114 formed on the slide pin 103 are engaged with the locking holes 117. Therefore, detachment thereof can effectively be prevented. At the same time, the connection pieces 118 on the cam member 104 are press-fitted into the through hole 113 of the slide pin 103, and the front end square portion of the connection piece 118 are pushed to widen the inner surface of the through hole 113. Therefore, rattling of the slide pin 103 can also effectively be prevented.

Figure 16:
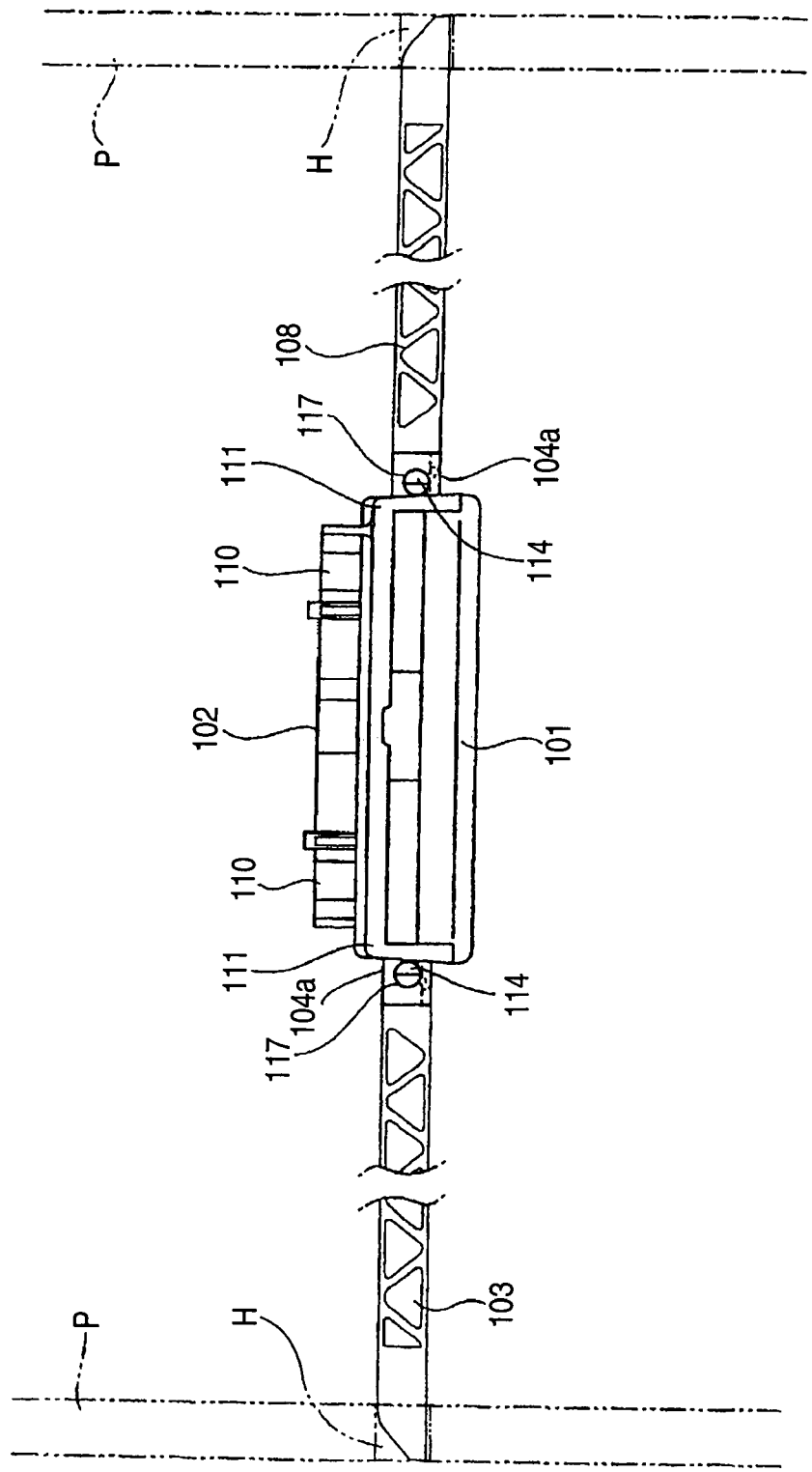
FIG. 16 is a plane view showing a state of engaging a front end portion of the sliding with a lock hole of an instrument panel.

Accordingly, thereby, the lock apparatus is subjected to actual use. In a state where the operation handle 101 is not operated to swing, as shown in FIG. 16, the pair of left and right slide pins 103 are projected by the urge spring pressure of the compression coil springs 105 and engaged from through holes Ba defined on side surfaces of the glove box main body B into lock holes H of the instrument panel P. Therefore, thereby, the glove box main body B is locked in the closed state.

Figure 17:
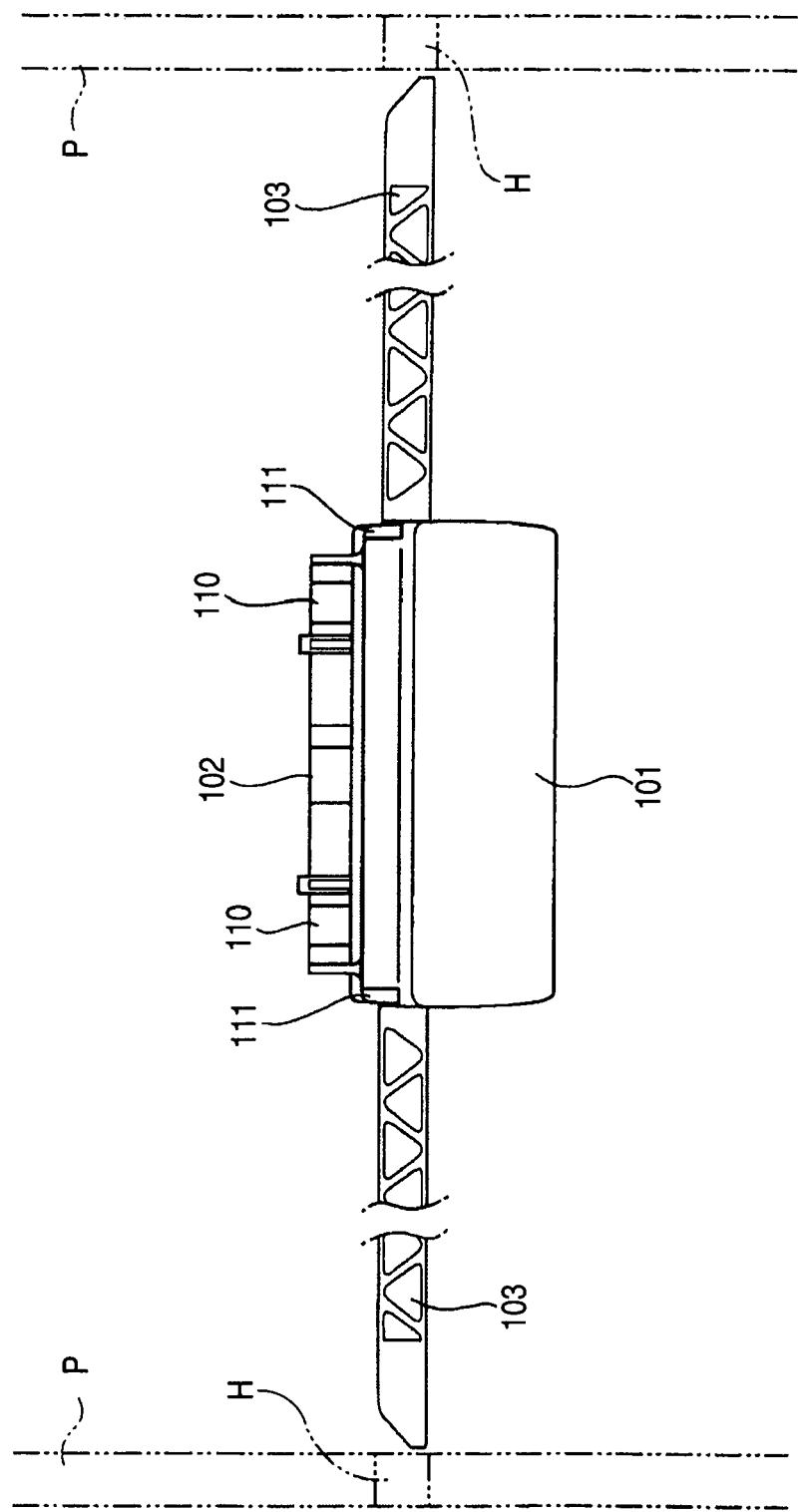
FIG. 17 is a plane view showing a state of retracting the front end portion of the slide pin from the lock hole of the instrument panel by operating to swing the operation handle.

Further, in the case of releasing such a locked state, when the operation handle 101 is held and pulled up, the projected portions 107 in the cylindrical portions 106, which operate with the swing of the operation handle 101, is moved along the groove edges of the oblique sides of the corresponding cam grooves 120, and the cam member 104 is retracted into the cylindrical portion 106. Therefore, as shown in FIG. 17, the front end portions of the respective slide pins 103 are retracted from the lock holes H of the instrument panel P and the glove box main body B is permitted to swing in the opening direction.

Further, at this time, when the operator lets go the operation handle 101, the restraint between the projected portions 107 of the cylindrical portion 106 rotated cooperatively therewith and the cam grooves 120 is released. Then, the operation handle 101 is going to swing rapidly in the reverse direction along with the cylindrical portion 106 by the spring pressure of the compression coil springs 105. At the same time, also the slide pin 103 are going to be projected in directions of the lock holes H rapidly by receiving the urge spring pressure of the compression coil springs 105. However, according to the second embodiment, the O-rings 124 are brought into sliding contact simultaneously with the inner surfaces of the cylindrical portions 106 of the operation handle 101 constituting the outer cylindrical member and the outer surfaces of the rear end portions 104b having the cylindrical shape of the cam members 104 constituting the inner cylindrical member. Therefore, due to the sliding resistance (braking force) of the O-rings 124, the operation handle 101 slowly returns to swing in a direction of a non-operating position. Thereby, the stoppers for restricting the amount of projecting the slide pin 103, that is, in this case, the operation handle 101 and the support frame 102 do not strongly collide each other. Therefore, a concern of emitting the large impact sound as in the prior art is sufficiently restrained. There is not the concern that the impact sound reminds the operator of destruction of the apparatus and gives the uneasy feeling, the distrustful feeling or the unpleasant feeling.

Conversely, when the opened glove box main body is closed, the glove box main body B is swung in the closing direction, At this time, the front end portions of the respective slide pins 103 projected in the directions of the lock holes H are brought into contact with wall faces of the instrument panel P opposed to each other. Then, the front end portions of the respective slide pins 103 pass through the wall faces while temporarily retracting linearly. Finally the front end portion of each slide pin 103 is engaged with the lock holes H of the instrument panel P by the urge spring pressure of the compression coil springs 105. Therefore, thereby, the glove box main body is locked in the above-described closed state.

In this case, the projected portions 107 in the cylindrical portion 106 are moved linearly in cam grooves 120 through shortcut to retract the cam members 104 into the cylindrical portion 106. Therefore, when the slide pin 103 are engaged with the lock holes H, the slide pin 103 are going to project in direction of the lock holes H rapidly by the urge spring pressure of the compression coil springs 105. However, similarly, the O-rings 124 are brought into sliding contact simultaneously with the inner surfaces of the cylindrical portion 106 of the operation handle 101 and the outer surfaces of the rear end portions 104b having the cylindrical shape of the cam members 104. Therefore, due to the sliding resistance of the O-rings 124, the cam members 104 are slowly projected in the direction of the lock holes H, in insides of the cylindrical portion 106. Thereby, the stoppers for restricting the projection amount, that is, in this case, the cam groove 120 and the projected portion 107 do not strongly collide each other. Therefore, also in this case, a concern of emitting large contact sound is sufficiently restrained. There is not the concern that the impact sound reminds the operator of destruction of the apparatus to give the uneasy feeling, the distrustful feeling or the unpleasant feeling.

That is, according to the second embodiment, as described above, a single piece of the O-ring 124 simultaneously provides the sliding resistance against the swing movement of the operation handle 101 and the sliding resistance against the linear movement of the slide pin 103 to enable to effectively restrain emitting the impact sound in two operational modes. Therefore, it is needless to say that the second embodiment is naturally extremely rational and effective. If a soft buffer member is going to be used in place of the O-ring 124, not only the buffer member must be pasted on entire regions of impact faces of the respective stoppers but also when the buffer member is destroyed, a displacement in the restricting position may be caused.

Further, according to the configuration of arranging the O-ring 124 between the cylindrical portion 106 of the operation handle 101 and the cam member 104 connecting the slide pin 103, not only a space needs not to provide by other portion but also operation of assembling the O-ring 124 to the glove box main body B is facilitated. Even when a fluctuation is produced between the inner diameter of the cylindrical portion 106 of the operation handle 101 and the outer diameter of the rear end portion 104b of the cam member 104 having the cylindrical shape, also the fluctuation can effectively be absorbed. Further, even when grease is pasted on the O-ring 124, the grease needs not to paste on the slide pin 103 or the like, which have lots of chance to touch by the hand. Further, the sufficient sliding resistance is achieved by the elasticity of the O-ring 124 itself. Therefore, it is not necessary to use grease having high viscosity, which is liable to harden at low temperatures. Further, the O-ring 124 can freely be selected from standard products and therefore, the O-ring 124 is not only economical but also excellent in general purpose performance.

Third Embodiment

Figure 18:
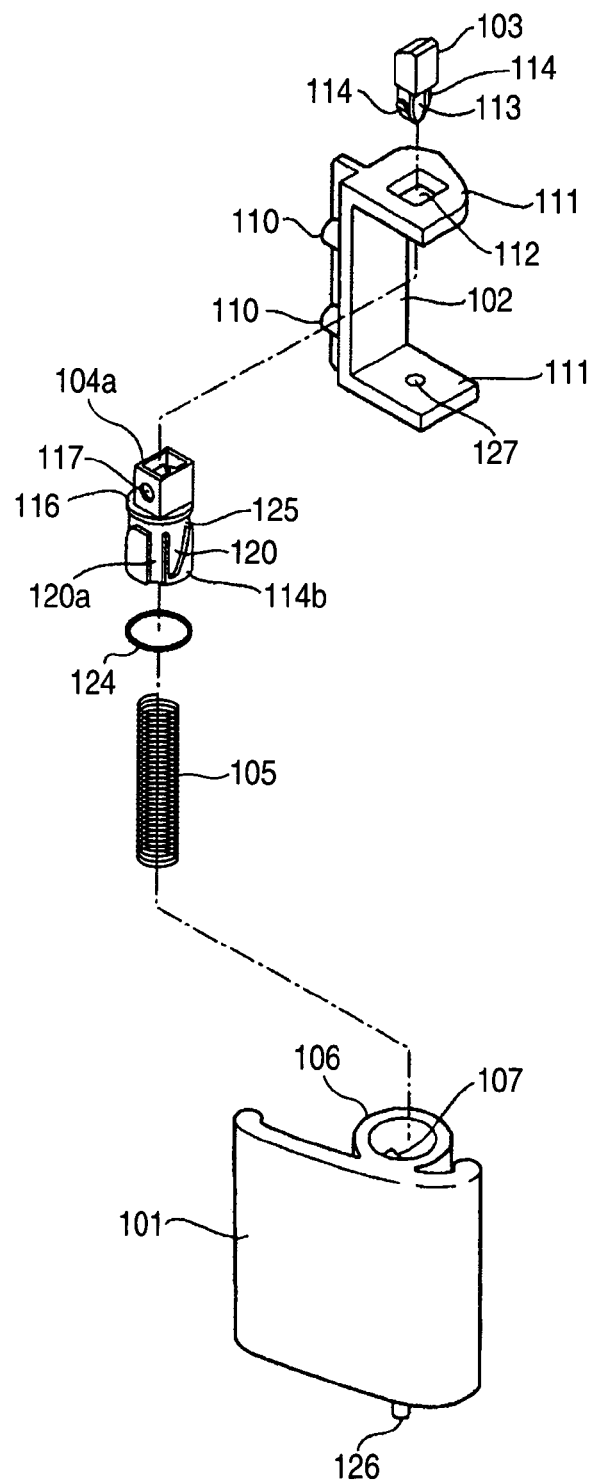
FIG. 18 is an exploded perspective view to show a center lock apparatus according to a third embodiment of the invention

Next, a lock apparatus according to a third embodiment will be described. The lock apparatus according to the third embodiment is different from the lock apparatus of the second embodiment in that it has been developed as a center lock apparatus for a glove box. A basic structure of the lock apparatus according to the third embodiment is similar to that of the second embodiment. That is, as shown in FIG. 18, the lock apparatus includes the operation handle 101, the support frame 102, the slide pin 103, the cam member 104, the compression coil spring 105 and the O-ring 124.

However, since the third embodiment has been developed as the center lock apparatus, which have the operation handle 101 with a vertical swing axis, a single piece of the cylindrical portion 106 is formed on a rear surface side thereof. A single piece of the cam member 104 having the containing groove 125 mounted with the O-ring 124 and a single piece of the compression coil spring 105 are inserted into the single piece of the cylindrical portion 106 in up and down directions. One of the bend walls 111 of the support frame 102 is formed the opening 112 in the rectangular shape for permitting the front end portion 104a having the square tubular shape of the single piece of the cam member 104 to go in and out the opening 112. The other bend walls 111 is formed a support hole 127 in the circular shape for supporting a shaft portion 126 provided at a bottom surface of the cylindrical portion 106 of the operation handle 101. The slide pin 103 is formed to have a short length, which allows the slide pin 103 to be detachably engaged with a striker 128 disposed in a hollow of the instrument panel P.

Therefore, also in the case of assembling the lock apparatus having such a configuration, first, the O-ring 124 is mounted to the containing groove 125 on the side of the single piece of the cam member 24. Under this state, the single piece of the compression coil spring 105 and the single piece of the cam member 104 are inserted into the cylindrical portion 106 of the operation handle 101. When the projected portion 107 is inserted into the cam groove 120 while rotating the cam member 104, the single piece of the cam member 104 is urged to project outwardly the front end portion 104a having the square tubular shape by the spring pressure of the compression coil spring 105.

Figure 19:
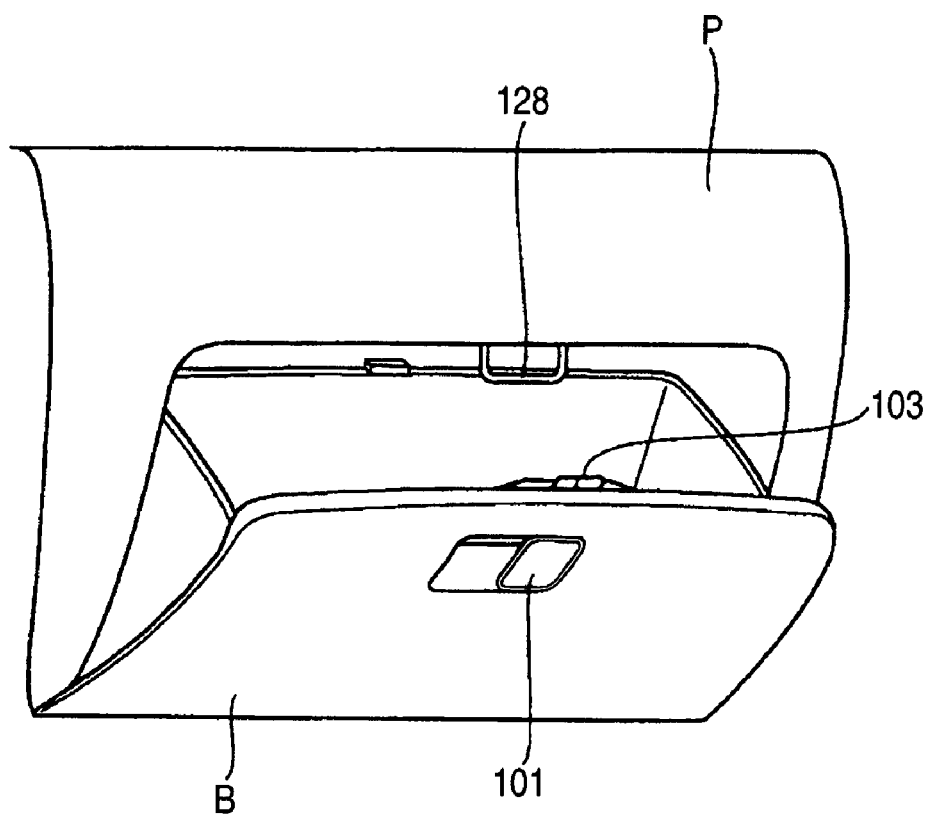
FIG. 19 is a perspective view of an essential portion showing a state of integrating the center lock a to a glove box main body B.

Hence, the support frame 102 is assembled to the operation handle 101 under the state. In this case, similar to the second embodiment, after the entire cam member 104 is pulled into the cylindrical portion 106, when the support frame 102 is fitted to cover the rear face side of the operation handle 101 by utilizing the state, the support frame 102 is assembled to the operation handle 101. Therefore, successively, when the support frame 102 is screwed on the attaching wall extending at inside of the recessed portion of the glove box main body B, as shown in FIG. 19, the operation handle 101 is swingably supported on the side of the recessed portion.

Thereby, the lock apparatus according to the third embodiment is subjected to actual use. In the state where the operation handle 101 is not operated to swing, although not specifically illustrated, the slide pin 103 is projected by the urge spring pressure of the compression coil spring 105 and is engaged with the striker 128 on the instrument panel P. Thereby, the glove box main body B is locked in the closed state.

Further, in the case of releasing the locked state, when the operation handle 101 is held and pulled, the projected portion 107 in the cylindrical portion 106 is moved along the groove edge of the oblique side of the corresponding cam groove 120 to pull the cam member 104 into the cylindrical portion 106. Therefore, the front end portion of the slide pin 103 is retracted from the striker 128 on the instrument panel P. Then, the glove box main body is permitted to swing in the opening direction.

Further, at this time, when the operator lets go the operation handle 101, the constraint between the projected portion 107 of the cylindrical portion 106 rotated cooperatively therewith and the cam groove 120 is released. The operation handle 101 is going to swing rapidly in the reverse direction together with the cylindrical portion 106 by the spring pressure of the compression spring 105. At the same time, also the slide pin 103 is going to be projected in the direction of the striker 128 by receiving the urge spring pressure of the compression coil spring 105. However, also in the third embodiment, the O-ring 124 is brought into sliding contact simultaneously with the inner surface of the cylindrical portion 106 of the operation handle 101 and the outer surface of the rear end portion 104a having the cylindrical shape of the cam member 104. Therefore, due to the sliding resistance of the O-ring 124, the operation handle 101 is slowly returned to swing in the direction of the non-operating position. Thereby, the stoppers for restricting the amount of projecting the slide pin 103, that is, the operation handle 101 and the support frame 102 do not strongly collide each other. Therefore, also according to the third embodiment, the concern of emitting large impact sound is sufficiently resolved. There is not the concern that the impact sound reminds the operator of destruction of the apparatus to give the uneasy feeling, the distrustful feeling or the unpleasant feeling.

Conversely, when the opened glove box in a body B is closed, the glove box main body B is rotated in the closing direction. At this time, the front end portion of the slide pin 103 is brought into contact with the striker 128 of the instrument panel P. The front end portion of the slide pin 103 passes through the striker 128 while being temporarily retracted linearly. Finally the front end portion of the slide pin 103 engages with the striker 128 of the instrument panel P from the inner side by the urge spring pressure of the compression coil spring 105. Thereby, the lock apparatus is locked into the above-described locked state.

In this case, the projected portion 107 in the cylindrical portion 106 is moved linearly in the cam groove 120 through shortcut to pull the cam member 104 into the cylindrical portion 106. Therefore, when the slide pin 103 is engaged with the striker 128, regardless of the operation handle 101, the slide pin 103 is going to be projected in the direction of the striker 128 rapidly by receiving the urge spring pressure of the compression coil spring 105. However, similarly, the O-ring 124 is brought into sliding contact simultaneously with the inner surface of the cylindrical portion 106 of the operation handle 101 and the outer surface of the rear end portion 104a having the cylindrical shape of the cam member 104. Therefore, due to the sliding resistance of the O-ring 124, the cam member 104 is slowly projected in the direction of the striker 128 at inside of the cylindrical portion 106. Thereby, the stoppers for restricting the projection amount, that is, the cam groove 120 and the projected portion 107 do not collide each other. Therefore, there is not the concern that the impact sound reminds the operator of destruction of the apparatus to give the uneasy feeling the distrustful feeling or the unpleasant feeling.

As described in the second and third embodiments, one end of the cylindrical portion 106 has an opening side, and it is sealed by the O-ring 124 and the cam member 104. The other end of the cylindrical portion 106 has a bottom surface. Therefore, when the slit 109 is blocked, the cam groove 120 and the projected portion 107, which serve as a sound source of the impact sound, can be completely blocked out the outside and be isolated. As described above, the cam groove 120 and the projected portion 107, which serve as the movement conversion mechanism, are disposed in a sealed space. Thereby, even when the impact sound occurs, the impact sound is not leaked from the inside of the cylindrical portion 106 to the outside thereof. Therefore, the lock apparatus further improving the silent characteristic can be provided. In this case, with regard to a method of blocking the slit 109, another member having the same shape as the slit 109 may be embedded into the slit 109. Alternatively, still another member for covering the entire cylindrical portion 106 or the entire rear surface of the operation handle 101 may be also used as to block the slit 109.

In the second and third embodiments, the cam groove 120 is formed in the right triangle shape. A slide movement between a groove edge of the oblique side of the right triangle and the projected portion 107 causes the conversion of the swing movement of the operation handle 101 into the linear movement of the slide pin 103 under a normal use state. The same effect of the second and third embodiments can be obtained so long as the cam member 104 includes a groove edge having an angle with respect to a swing axis line other than the angle being parallel to or perpendicular to the swing axis line. In this case, a shape of the groove edge in a longitudinal direction may be a linear shape, a curved shape, or a free curved shape. This embodiment can be used so long as a straight line connecting both end positions of a sliding range of the projected portion 107 is not parallel to or perpendicular to the swing axis line.

In the second and third embodiments, the cam member 104 is inserted into the cylindrical portion 106 of the operation handle 101 so that the entire outer surface of the O-ring 124 slide-contacts with the inner surface of the cylindrical portion 106. Alternatively, the invention can be used in such a case that the cylindrical portion 106 does not have a complete cylindrical shape but has an inner surface of a part of the cylindrical shape, that is, a semi-cylindrical shape and such cylindrical portion 106 slide-contacts with a part of the outer surface of the O-ring 124.

In the second and third embodiments, as described above, the cam member 104 is inserted into the cylindrical portion 106 of the operation handle 101. The projected portion 107 formed on the inner surface of the cylindrical portion 106 and the cam groove 120 formed on the surface of the cam member 104 convert the swing movement of the operation handle 101 into the linear movement of the slide pin 103. Alternatively, the cam member 104 may be formed in a cylindrical shape and be formed the cam groove 120 on the inner surface thereof. The projected portion 107 may be formed on an outer surface of the cylindrical portion 106. Then, the cylindrical portion may be inserted into the cam member 104. With this alternative configuration, the swing movement of the operation handle 101 can be converted into the liner movement of the slide pin 103. Therefore, the same effect of the second and third embodiments can be obtained. In this case, the invention can be used so long as a gap is defined between the outer surface of the cylindrical portion 106 and the operation handle 101 so that the cylindrical portion 106 can be inserted into the cam member 104 or the cam member 104 is formed in the semi-cylindrical shape to cover a part of the outer surface of the cylindrical portion 106.

In the second and third embodiments, the swing axis of the operation handle 101 and the linear-movement axis of the slide pin 103 are the same axis as described above. In order to expand design freedom, it may be possible to arrange the swing axis of the operation handle 101 and the linear-movement axis of the slide pin 103 in parallel to each other. In this case, the invention can be used so long as the cam member 104 and the slide pin 103 are connected via a connection bar or the like. Thereby, since the swing movement of the operation handle 101 can be converted into the linear movement of the slide pin 103, the same effect of the second and third embodiments can be obtained.

Because of the same reason, it maybe possible to arrange the swing axis of the operation handle 101 and the linear-movement axis of the slide pin 103 to be perpendicular to each other. In such case, in place of the movement conversion mechanism including the cam groove 120 and the projected portion 101, a rack-and-pinion mechanism or a piston-and-crank mechanism may be adopted as a movement conversion mechanism. The O-ring 124 is arranged to slide-contact with the inner surface of the outer cylindrical member constituting a rotating portion and the outer surface of the inner cylindrical member simultaneously. Thereby, a lock apparatus improving the silent characteristic can be provided.

When the lock apparatus according to the second hand third embodiments is applied particularly to the glove box attached openably to the instrument panel of the automobile, the lock apparatus can effectively restrain emitting of impact sound reminding an operator easily of destruction of the apparatus itself. Such lock apparatus is very preferable.

What is claimed is:

1. A lock apparatus for attaching a container member to a support member openably, the lock apparatus comprising:
   an operation handle;
   a spring, which is movably supported by the container member;
   a slide pin, which is urged in a direction of a lock hole defined on the support member by the spring, respectively; and
   a cam member to which a rear end portion of the slide pin is attached to urge the slide pin to project and retract, and
   wherein when the operation handle is operated in a swing manner, a front end portion of the slide pin is retracted from the lock hole of the support member against pressure of the spring, and
   wherein a cylinder that accommodates the cam member is formed on the operation handle.

2. The lock apparatus according to claim 1, wherein the spring is accommodated within the cylinder.

3. The lock apparatus according to claim 1, further comprising a support frame that supports the operation handle, wherein the operation handle supports the spring and the cam member.

4. The lock apparatus according to claim 1, further comprising a support frame that include a screw hole on a rear surface side thereof and that includes bent walls bent to extend in a direction towards the cylinder at both side edges thereof,
   wherein each of the bent walls includes an opening that allows a front end of the cam member to go therethrough.

5. The lock apparatus according to claim 4, wherein the cam member is supported by the opening so that the front end is not rotatable but can go through the opening.

6. the lock apparatus according to claim 1, wherein the cylinder includes a projection on an inner face thereof, and
   wherein the cam member includes a cam groove having a guide portion for guiding the projection into the cam groove.

7. The lock apparatus according to claim 1, wherein the cylinder includes a pair of projections on an inner face thereof, the pair of projections being opposed to each other, and
   wherein the cam member includes a pair of cam grooves each including a guide portion for guiding the one of the projections thereinto.

8. The lock apparatus according to claim 1, wherein the cam member includes a cam groove having a lock portion for locking the cam member at a position that the cam member is retracted in the cylinder.

9. The lock apparatus according to claim 8, wherein said lock portion comprises a substantially flat surface shape perpendicular to a direction of movement of the cam member.

10. The lock apparatus according to claim 1, further comprising an O-ring which slide contacts with the cylinder and a cylindrical portion of the cam member simultaneously.

11. The lock apparatus according to claim 1, wherein said slide pin comprises an end portion, said end portion comprising:
    a bifurcated structure comprising elastic pieces.

12. The lock apparatus according to claim 1, wherein the cylinder slidably supports the cam member.

13. The lock apparatus according to claim 1, wherein the cylinder comprises a pair of projected portions on an inner face thereof, the pair of projected portions being opposed to each other such that a first of said pair of projected portions is formed on an upper portion of the inner face and a second of said pair of projected portions is formed on a lower portion of the inner face, and
    wherein the cam member includes a pair of cam grooves each including a guide portion for guiding the one of the projected portions thereinto.

14. The lock apparatus according to claim 1, wherein the cylinder comprises a pair of projected portions on an inner face thereof, the pair of projected portions being disposed opposed to each other with respect to a center of said cylinder, and
    wherein the cam member includes a pair of cam grooves each including a guide portion for guiding the one of the projected portions thereinto.

15. The lock apparatus according to claim 1, wherein said cam member is substantially entirely contained within said cylinder.

16. The lock apparatus according to claim 1, wherein said slide pin comprises an end portion, said end portion comprising:
    a generally U-shaped extension portion extending from said end portion, said generally U-shaped extension portion comprising a through hole for engaging a contact piece disposed on said cam member.

17. The lock apparatus according to claim 16, wherein said generally U-shaped extension portion comprises a pair of projections, said projects engaging a pair of holes in said cam member.

18. The lock apparatus according to claim 1, wherein said slide pin includes an extension portion extending from an end of said slide pin,
   wherein said cam member includes a generally square tubular portion, and
   wherein said extension portion of said slide pin is inserted into said generally square tubular portion.

19. The lock apparatus according to claim 18, wherein said slide pin further includes a pair of projections disposed on said extension portion.

20. The lock apparatus according to claim 1, wherein the cam member and the cylinder are configured to rotate relatively opposed to one another.

21. A method of assembling a lock apparatus for attaching a container member to a support member openably, the method comprising:
   providing the lock apparatus, the lock apparatus comprising:
      an operation handle;
      a spring, which is movably supported by the container member; and
      a cam member; and
   inserting a slide pin into the cam member, the slide pin being urged in a direction of a lock hole defined on the support member by the spring,
   wherein a rear end portion of the slide pin is attached to the cam member to urge the slide pin to project and retract,
   wherein when the operation handle is operated in a swing manner, a front end portion of the slide pin is retracted from the lock hole of the support member against pressure of the spring, and
   wherein a cylinder that accommodates the cam member is formed on the operation handle.

22. A lock apparatus for attaching a container member to a support member openably, the lock apparatus comprising:
   an operation handle;
   a pair of springs, which are movably supported by the container member;
   a pair of slide pins, which are urged in a direction of a lock hole defined on the support member by the springs, respectively; and
   a pair of cam members to which a rear end portion of the slide pins is attached to urge the slide pins to project and retract, and
   wherein when the operation handle is operated in a swing manner, a front end portion of the slide pins is retracted from the lock hole of the support member against pressure of the springs, and
   wherein a cylinder that accommodates the cam members is formed on the operation handle.

* * * * *